US009228490B2

(12) United States Patent
Wood

(10) Patent No.: US 9,228,490 B2
(45) Date of Patent: Jan. 5, 2016

(54) SYSTEM AND METHOD FOR ELECTRICALLY-COUPLED HEAT ENGINE AND THERMAL CYCLE

(71) Applicant: Altor Limited LC, Concord, MA (US)

(72) Inventor: Jonathan R. Wood, Concord, MA (US)

(73) Assignee: Altor Limited LC, Concord, MA (US)

( * ) Notice: Subject to any disclaimer, the term of this patent is extended or adjusted under 35 U.S.C. 154(b) by 0 days.

(21) Appl. No.: 14/633,495

(22) Filed: Feb. 27, 2015

(65) Prior Publication Data

US 2015/0307796 A1    Oct. 29, 2015

Related U.S. Application Data

(60) Continuation of application No. 14/219,849, filed on Mar. 19, 2014, now Pat. No. 8,991,340, which is a division of application No. 13/009,252, filed on Jan. 19, 2011, now Pat. No. 8,726,857.

(60) Provisional application No. 61/311,479, filed on Mar. 8, 2010, provisional application No. 61/296,140, filed on Jan. 19, 2010.

(51) Int. Cl.
*F02B 71/04* (2006.01)
*F02B 63/04* (2006.01)
(Continued)

(52) U.S. Cl.
CPC ............... *F02B 71/04* (2013.01); *F02B 63/041* (2013.01); *H02K 7/18* (2013.01)

(58) Field of Classification Search
CPC .......... F02B 43/08; F02B 43/10; F02B 47/00; F02B 63/00; F02B 63/04; F02B 63/041; F02B 63/06; F02B 71/04; F02M 25/00; F02M 27/00; F02M 27/02; F02M 27/04; F02M 27/045; F02M 2027/047; H02K 7/18; H02K 7/1815; H02K 7/1853; H02K 7/1876; H02K 7/1884; C10L 3/00; C10L 2270/02; C10L 2290/06; C10L 2290/58; C01B 3/02; C01C 1/04; B01J 19/18; B01J 19/0013; B01J 2219/00049
USPC ..... 123/1 A, 3, 46 E, 46 R, 51 R, 149 R, 322, 123/272, 670, 554, 557, 558, 536, 538; 290/1 A, 1 R
See application file for complete search history.

(56) References Cited

U.S. PATENT DOCUMENTS 3,675,031 A   7/1972 Lavigne
3,766,399 A  10/1973 Demetrescu
(Continued)

FOREIGN PATENT DOCUMENTS

EP     0463818 A1   1/1992
GB     2 023 236    12/1979
(Continued)

OTHER PUBLICATIONS

Office Action, U.S. Appl. No. 14/224,283 dated Aug. 19, 2014.
(Continued)

*Primary Examiner* — Lindsay Low
*Assistant Examiner* — Grant Moubry
(74) *Attorney, Agent, or Firm* — Hamilton, Brook, Smith & Reynolds, P.C.

(57) ABSTRACT

In accordance with an embodiment of the invention, there is provided a device for generating electrical energy using a thermal cycle of a working gas. The device comprises at least one piston movably mounted in a container to form a working chamber between the at least one piston and the container, the working chamber containing the working gas performing the thermal cycle. An electrical circuit is mounted stationary relative to the container, the electrical circuit being electromagnetically coupled to provide a motive force to the at least one piston. An electronic power converter is electrically connected to the electrical circuit and to an electrical bus, and an electrical storage device is electrically connected to the electrical bus. The at least one piston is movably mounted such that its motion electromagnetically induces current in the electrical circuit. An electronic controller is electronically connected to the electronic power converter to control motion of the at least one piston to perform, in the thermal cycle, at least one of: (i) expanding the working gas beyond the volume at which compression of the working gas is begun within the thermal cycle or (ii) exhausting the working gas to a remaining volume less than the smallest volume of compressed gas within the thermal cycle. The electronic controller further controls flow of electrical energy to and from the electrical bus to effect a net positive average power transfer from the working gas to the electrical bus over the course of the thermal cycle.

20 Claims, 24 Drawing Sheets

(51) Int. Cl.
*H02K 7/18* (2006.01)
*F02M 27/02* (2006.01)

(56) References Cited

U.S. PATENT DOCUMENTS

| | | | |
|---|---|---|---|
| 4,215,548 | A | 8/1980 | Beremand |
| 4,434,617 | A | 3/1984 | Walsh |
| 4,511,805 | A | 4/1985 | Boy-Marcotte et al. |
| 4,522,805 | A | 6/1985 | Gordon |
| 4,589,380 | A | 5/1986 | Coad |
| 4,642,547 | A | 2/1987 | Redlich |
| 4,697,113 | A | 9/1987 | Young |
| 4,761,960 | A | 8/1988 | Higham et al. |
| 4,888,951 | A | 12/1989 | Beale |
| 4,926,639 | A | 5/1990 | Mitchell |
| 5,040,372 | A | 8/1991 | Higham |
| 5,329,768 | A | 7/1994 | Moscrip |
| 5,752,385 | A | 5/1998 | Nelson |
| 5,775,273 | A | 7/1998 | Beale |
| 6,198,256 | B1 | 3/2001 | Miyazaki et al. |
| 6,385,972 | B1 | 5/2002 | Fellows |
| 6,541,875 | B1 | 4/2003 | Berlinger et al. |
| 6,694,731 | B2 | 2/2004 | Kamen et al. |
| 6,968,688 | B2 | 11/2005 | Gimsa |
| 7,152,404 | B2 | 12/2006 | Francois et al. |
| 7,191,738 | B2 | 3/2007 | Shkolnik |
| 7,200,994 | B2 | 4/2007 | Chertok |
| 7,318,506 | B1 | 1/2008 | Meic |
| 7,690,199 | B2 | 4/2010 | Wood |
| 7,777,357 | B2 | 8/2010 | Hyde et al. |
| 7,845,317 | B2 | 12/2010 | Max et al. |
| 7,856,714 | B2 | 12/2010 | Hyde et al. |
| 7,950,356 | B2 | 5/2011 | Hyde et al. |
| 8,172,912 | B2 * | 5/2012 | Marsh et al. ............... 48/61 |
| 8,196,402 | B2 | 6/2012 | Wood |
| 8,432,047 | B2 | 4/2013 | Schilling |
| 8,701,404 | B2 | 4/2014 | Wood |
| 8,720,198 | B2 | 5/2014 | Wood |
| 8,991,340 | B2 | 3/2015 | Wood |
| 2003/0121259 | A1 | 7/2003 | Conrad |
| 2005/0109295 | A1 | 5/2005 | Kaneko et al. |
| 2007/0157894 | A1 | 7/2007 | Scuderi et al. |
| 2007/0169476 | A1 | 7/2007 | Wood |
| 2008/0036312 | A1 | 2/2008 | Max et al. |
| 2008/0098972 | A1 | 5/2008 | Elwart |
| 2009/0090334 | A1 | 4/2009 | Hyde et al. |
| 2009/0091138 | A1 | 4/2009 | Hyde et al. |
| 2009/0091195 | A1 | 4/2009 | Hyde et al. |
| 2009/0094827 | A1 | 4/2009 | Hyde et al. |
| 2009/0308345 | A1 | 12/2009 | Van Den Brink |
| 2010/0115941 | A1 | 5/2010 | Wood |
| 2010/0115942 | A1 | 5/2010 | Wood |
| 2010/0127506 | A1 | 5/2010 | Wood |
| 2010/0187031 | A1 | 7/2010 | Waszak et al. |
| 2010/0289263 | A1 | 11/2010 | Hyde et al. |
| 2011/0174271 | A1 | 7/2011 | Wood |
| 2012/0280179 | A1 * | 11/2012 | Marsh et al. .............. 252/372 |
| 2013/0295002 | A1 * | 11/2013 | Marsh et al. .............. 423/579 |
| 2014/0283511 | A1 | 9/2014 | Wood |

FOREIGN PATENT DOCUMENTS

| | | |
|---|---|---|
| JP | 64003235 | 1/1989 |
| JP | 04262025 | 9/1992 |
| JP | 2001241302 | 9/2001 |
| JP | 2001289119 | 10/2001 |
| JP | 2005155345 | 6/2005 |
| WO | WO 9612879 A1 * 5/1996 ............. F02B 71/00 |
| WO | WO 01/88353 A1 11/2001 |
| WO | WO 03/072909 9/2003 |
| WO | WO 2005/021966 3/2005 |
| WO | WO 2010/104601 9/2010 |
| WO | WO 2012/170003 A2 12/2012 |

OTHER PUBLICATIONS

International Search Report and Written Opinion of PCT/US2011/021695 dated Jun. 16, 2011 "System and Method for Electrically-Coupled Heat Engine and Thermal Cycle."

International Preliminary Report on Patentability, International Application PCT/US2007/000313, 8 pages, Aug. 7, 2008 "System and Method for Electrically-Coupled Thermal Cycle."

Written Opinion and International Search Report, International Application PCT/US2007/000313, 15 pages, Oct. 11, 2007 "System and Method for Electrically-Coupled Thermal Cycle."

Office Action dated, Aug. 23, 2011, issued in U.S. Appl. No. 12/692,432 "System and Method for Electrically-Coupled Thermal Cycle."

Office Action dated, Nov. 21, 2011, issued in U.S. Appl. No. 12/692,440 "System and Method for Electrically-Coupled Thermal Cycle."

Office Action dated, Oct. 26, 2011, for U.S. Appl. No. 12/692,406 "System and Method for Electrically-Coupled Thermal Cycle."

Office Action made Final, dated Feb. 3, 2012, issued in U.S. Appl. No. 12/692,406 "System and Method for Electrically-Coupled Thermal Cycle."

Office Action made Final, dated Feb. 3, 2012, issued in U.S. Appl. No. 12/692,440 "System and Method for Electrically-Coupled Thermal Cycle."

Office Action made Final, dated Feb. 3, 2012, issued in U.S. Appl. No. 12/692,432 "System and Method for Electrically-Coupled Thermal Cycle."

Notice of Allowance, dated Apr. 9, 2012, issued in U.S. Appl. No. 12/692,432 "System and Method for Electrically-Coupled Thermal Cycle."

International Preliminary Report on Patentability and Written Opinion of PCT/US2011/021695 dated Aug. 2, 2012 "System and Method for Electrically-Coupled Heat Engine and Thermal Cycle."

Office Action dated, May 15, 2013, issued in U.S. Appl. No. 12/692,406 "System and Method for Electrically-Coupled Thermal Cycle."

Office Action dated, May 30, 2013, issued in U.S. Appl. No. 12/692,440 "System and Method for Electrically-Coupled Thermal Cycle."

Notice of Allowance dated, Dec. 3, 2013, issued in U.S. Appl. No. 12/692,406 /U.S. Pat. No. 8,701,404, Date of Issue Apr. 22, 2014 "System and Method for Electrically-Coupled Thermal Cycle."

Notice of Allowance dated, Dec. 27, 2013, issued in U.S. Appl. No. 12/692,440/U.S. Pat. No. 8,720,198, Date of Issue May 13, 2014 "System and Method for Electrically-Coupled Thermal Cycle."

Notice of Allowance dated, Dec. 17, 2013, issued in U.S. Appl. No. 13/009,252/U.S. Pat. No. 8,726,857, Date of Issue May 20, 2014 "System and Method for Electrically-Coupled Heat Engine and Thermal Cycle."

Office Action dated Aug. 15, 2013 for U.S. Appl. No. 13/009,252 "System and Method for Electrically-Coupled Heat Engine and Thermal Cycle."

Office Action dated Mar. 10, 2009 for U.S. Appl. No. 11/338,421 "System and Method for Electrically-Coupled Thermal Cycle."

Office Action for U.S. Appl. No. 14/224,283, entitled: "System and Method for Electrically-Coupled Thermal Cycle", Dated: Jun. 9, 2015.

* cited by examiner

SYSTEM AND METHOD FOR ELECTRICALLY-COUPLED HEAT ENGINE AND THERMAL CYCLE

RELATED APPLICATIONS

This application is a continuation of U.S. application Ser. No. 14/219,849, filed Mar. 19, 2014, which is a divisional of Ser. No. 13/009,252, filed Jan. 19, 2011, now U.S. Pat. No. 8,726,857, which claims the benefit of U.S. Provisional Application No. 61/311,479, filed on Mar. 8, 2010, and claims the benefit of U.S. Provisional Application No. 61/296,140, filed on Jan. 19, 2010. The entire teachings of the above applications are incorporated herein by reference.

BACKGROUND OF THE INVENTION

A thermal cycle of a heat engine that employs a quantity of gas as an operating medium can be described by reference to a pressure-volume (P-V) diagram. The net energy delivered from one thermal cycle is the area of the loop swept out by the operating path in the P-V plane. In the course of each cycle, energy is delivered by the engine for part of the cycle, and is absorbed by the engine for the remainder of the cycle. For some parts of some cycles, energy is neither stored nor delivered.

By necessity, part of the system used for extracting a net positive average power output must include a device for storing and returning energy out of and into the heat engine, on a cyclic basis. In conventional heat engines, this cyclic energy storage is accomplished by mechanical means, for example via the rotational inertia of a crankshaft with flywheel attached.

By contrast with such conventional heat engines that use mechanical means for cyclic energy storage, U.S. Pat. No. 7,690,199 B2 of Wood, entitled "System and Method for Electrically-Coupled Thermal Cycle," the disclosure of which is incorporated herein by reference in its entirety, describes an electrically-coupled thermal cycle.

There is an ongoing need to produce fuel efficient engines, vehicles and thermal cycles.

SUMMARY OF THE INVENTION

In accordance with an embodiment of the invention, there is provided a device for generating electrical energy using a thermal cycle of a working gas. The device comprises at least one piston movably mounted in a container to form a working chamber between the at least one piston and the container, the working chamber containing the working gas performing the thermal cycle. An electrical circuit is mounted stationary relative to the container, the electrical circuit being electromagnetically coupled to provide a motive force to the at least one piston. An electronic power converter is electrically connected to the electrical circuit and to an electrical bus, and an electrical storage device is electrically connected to the electrical bus. The at least one piston is movably mounted such that its motion electromagnetically induces current in the electrical circuit. An electronic controller is electronically connected to the electronic power converter to control motion of the at least one piston to perform, in the thermal cycle, at least one of: (i) expanding the working gas beyond the volume at which compression of the working gas is begun within the thermal cycle or (ii) exhausting the working gas to a remaining volume less than the smallest volume of compressed gas within the thermal cycle. The electronic controller is further electronically connected to the electrical bus to control both (i) flow of electrical energy produced by the current induced in the electrical circuit to the electrical bus, and (ii) flow of electrical energy from the electrical bus to the electrical circuit to electromagnetically provide the motive force to the at least one piston, and to effect a net positive average power transfer from the working gas to the electrical bus over the course of the thermal cycle.

In further, related embodiments, the device may comprise a combustion device to combust the working gas in the thermal cycle. The device may comprise at least one orifice to effect intake and exhaustion of the working gas from the container, the thermal cycle comprising combustion of the working gas; or the device may comprise at least one orifice to effect intake and exhaustion of the working gas from the container without combustion of the working gas in the thermal cycle. The working gas may be air. An exterior surface of the container may be configured to conduct heat energy to the working gas. The at least one piston may comprise two pistons sharing a common working chamber. The two pistons may be in axial opposition to each other. The electronic controller may be configured to control motion of the pistons in the container to perform, in the thermal cycle, expansion of the working gas during motion of the pistons away from each other, and at least one of: (i) exhaustion of the working gas during motion of both pistons in the same direction relative to the container or (ii) exhaustion of the working gas while one piston is held at or near a fixed position relative to the container. The electronic controller may comprise a binary counter with a state corresponding to each stroke of the thermal cycle, the strokes of the thermal cycle comprising induction, compression, expansion, and exhaustion.

In further, related embodiments, the electronic controller may be configured to control the at least one piston to perform a thermal cycle comprising strokes of induction, compression, expansion and exhaustion, and a duration of any one of the thermal cycle strokes of induction, compression, expansion, and exhaustion may differ from the duration of any of the other said strokes. A distance traversed by the at least one piston relative to the container in any one of the strokes of induction, compression, expansion, and exhaustion may differ from a distance traversed by the at least one piston relative to the container during any of the other strokes. The electronic controller may be configured to control the at least one piston to perform more than one thermal cycle, and a duration of any one complete thermal cycle may differ from a duration of any other complete thermal cycle, of the more than one thermal cycle. The working chamber may comprise a single orifice for the intake and exhaustion of working gas. The single orifice may intake from, and exhaust to, ambient air. The thermal cycle may comprise combustion of the working gas, or may be without combustion of the working gas.

In other, related embodiments, the at least one piston may be entirely contained within the container. A mechanical support rigidly attached to the container may intrude into the at least one piston. The support may comprise a heat pipe for the transport of heat out of the container. The working chamber may comprise an orifice device for the intake or exhaustion of the working gas, said orifice device comprising an orifice device container, an orifice device piston and an orifice device electrical circuit, said orifice device electrical circuit being electromagnetically coupled to provide a motive force to the orifice device piston, and said orifice device piston being magnetically held in either of two positions within the orifice device container in the absence of electric current in the orifice device electrical circuit. The container and the at least one piston may each comprise a permanent magnet, the permanent magnet of the container and the permanent magnet of the at least one piston being mounted to be mutually repulsive. The container and the at least one piston may be mounted such that the weight of the at least one piston opposes a motion of expansion during the thermal cycle. The at least one piston may comprise an orifice for the intake or exhaustion of the working gas into or out of the working chamber. The container may comprise at least one orifice for the intake or exhaustion of the working gas into or out of the working chamber, said at least one orifice being shielded from the working chamber by the at least one piston for a portion of the thermal cycle. The container may comprise at least one magnetically-permeable spiral element electromagnetically coupled to the electrical circuit.

In further, related embodiments, an expansion ratio of the working gas may be related to a compression ratio of the working gas only by a temperature rise ratio and an adiabatic constant, the temperature rise ratio being an inherent chemical property of the working gas and being equal to the highest absolute temperature achieved by the working gas in the thermal cycle divided by the absolute temperature of the working gas at the end of the compression stroke of the thermal cycle. The relation of the expansion ratio to the compression ratio may be given by:

$$E/K = \tau^{1/\gamma}$$

where E is the expansion ratio, K is the compression ratio, $\gamma$ is the adiabatic constant and $\tau$ is the temperature rise ratio. A ratio of exhaust gas absolute temperature of the working gas to inlet gas absolute temperature of the working gas may depend only on a temperature rise ratio and on a value of an adiabatic constant, the temperature rise ratio being an inherent chemical property of the working gas and being equal to the highest absolute temperature achieved by the working gas in the thermal cycle divided by the absolute temperature of the working gas at the end of the compression stroke of the thermal cycle. The ratio of exhaust gas absolute temperature to inlet gas absolute temperature may be given by:

$$T_E/T_I = \tau^{1/\gamma}$$

where $T_E$ is the exhaust gas absolute temperature, $T_I$ is the inlet gas absolute temperature, $\gamma$ is the adiabatic constant and $\tau$ is the temperature rise ratio. Efficiency of the device may be a function only of a temperature rise ratio, a value of an adiabatic constant and a compression ratio of the working gas, the temperature rise ratio being an inherent chemical property of the working gas and being equal to the highest absolute temperature achieved by the working gas in the thermal cycle divided by the absolute temperature of the working gas at the end of the compression stroke of the thermal cycle. Efficiency of the device may be given by the relation:

$$\eta = 1 - [\gamma(\tau^{(1/\gamma)} - 1)/(K^{(\gamma-1)}(\tau-1))]$$

where $\eta$ is efficiency, $\gamma$ is the adiabatic constant, $\tau$ is the temperature rise ratio and K is the compression ratio of the working gas.

In further, related embodiments, the device may be capable of operating on a variety of different fuels. The device may be capable of operating on a fuel from the group consisting of: methanol, ethanol, propanol, benzene, octane, hydrogen and ammonia. The device may be capable of operating on a fuel that does not include carbon, such as hydrogen or ammonia. The electrical storage device may comprise at least one of a capacitor and a battery. The container may comprise a cylinder. The electronic controller may be electronically connected to the electronic power converter to control motion of the at least one piston to perform, in the thermal cycle, both: (i) expanding the working gas beyond the volume at which compression of the working gas is begun within the thermal cycle and (ii) exhausting the working gas to a remaining volume less than the smallest volume of compressed gas within the thermal cycle. The electronic controller may be configured to control the at least one piston to perform more than one thermal cycle, wherein an energy output of any one complete thermal cycle differs from an energy output of any other complete thermal cycle, of the more than one thermal cycle. The electronic controller may be electronically connected to the electronic power converter to control motion of the at least one piston to perform, in the thermal cycle: an induction stroke wherein working gas flows into the container during a motion of the at least one piston, an adiabatic compression stroke wherein the volume of the working gas is reduced during a motion of the at least one piston, a heating period wherein the temperature of the working gas rises, an adiabatic expansion stroke wherein the volume of the working gas is increased during a motion of the at least one piston beyond the volume at which compression of the working gas is begun within the thermal cycle, and an exhaustion stroke wherein the volume of the working gas is expelled from the container during a motion of the at least one piston to a remaining volume less than the smallest volume of compressed gas within the thermal cycle.

In further related embodiments, the electronic controller may be electronically connected to the electronic power converter to control motion of the at least one piston to perform, in the thermal cycle, at least one of: (i) expanding the working gas to atmospheric pressure or (ii) exhausting the working gas to a remaining volume that is less than the smallest volume of compressed gas within the thermal cycle and that is as small as practicable. The electronic controller may be electronically connected to the electronic power converter to control motion of the at least one piston to perform, in the thermal cycle, both: (i) expanding the working gas to atmospheric pressure and (ii) exhausting the working gas to a remaining volume that is less than the smallest volume of compressed gas within the thermal cycle and that is as small as practicable.

In another embodiment according to the invention, there is provided a device for pumping heat using electrical energy, the pumping of heat comprising performing a thermal cycle of a working gas. The device comprises at least one piston movably mounted in a container to form a working chamber between the at least one piston and the container, the working chamber containing the working gas performing the thermal cycle. An electrical circuit is mounted stationary relative to the container, the electrical circuit being electromagnetically coupled to provide a motive force to the at least one piston. An electronic power converter is electrically connected to the electrical circuit and to an electrical bus; and an electrical storage device is electrically connected to the electrical bus. The at least one piston is movably mounted such that its motion electromagnetically induces current in the electrical circuit. An electronic controller is electronically connected to the electronic power converter to control motion of the at least one piston to perform, in the thermal cycle, at least one of: (i) compressing the working gas over a volume greater than the volume through which the working gas is expanded within the thermal cycle or (ii) exhausting the working gas to a remaining volume less than the smallest volume of compressed gas within the thermal cycle. The electronic controller is further electronically connected to the electrical bus to control both (i) flow of electrical energy produced by the current induced in the electrical circuit to the electrical bus, and (ii) flow of electrical energy from the electrical bus to the electrical circuit to electromagnetically provide the motive force to the at least one piston, and to effect a net positive average power transfer from the electrical bus to the working gas over the course of the thermal cycle.

In further, related embodiments, the device may comprise at least one orifice to effect intake and exhaustion of the working gas from the container. The working gas may be air. An exterior surface of the container may be configured to conduct heat energy from the working gas. The at least one piston may comprise two pistons sharing a common working chamber. The two pistons may be in axial opposition to each other. The electronic controller may be configured to control motion of the pistons in the container to perform, in the thermal cycle, compression of the working gas during motion of the pistons toward each other, and at least one of: (i) induction of the working gas during motion of both pistons in the same direction relative to the container or (ii) induction of the working gas while one piston is held at or near a fixed position relative to the container. The electronic controller may comprise a binary counter with a state corresponding to each stroke of the thermal cycle, the strokes of the thermal cycle comprising induction, compression, expansion, and exhaustion.

In further, related embodiments, the electronic controller may be configured to control the at least one piston to perform a thermal cycle comprising strokes of induction, compression, expansion and exhaustion, and a duration of any one of the thermal cycle strokes of induction, compression, expansion, and exhaustion may differ from the duration of any of the other said strokes. A distance traversed by the at least one piston relative to the container in any one of the strokes of induction, compression, expansion, and exhaustion may differ from a distance traversed by the at least one piston relative to the container during any of the other strokes. The electronic controller may be configured to control the at least one piston to perform more than one thermal cycle, and a duration of any one complete thermal cycle may differ from a duration of any other complete thermal cycle, of the more than one thermal cycle. The working chamber may comprise a single orifice for the intake and exhaustion of working gas. The single orifice may intake from, and exhaust to, ambient air. The at least one piston may be entirely contained within the container. A mechanical support rigidly attached to the container may intrude into the at least one piston. The support may comprise a heat pipe for the transport of heat into or out of the container.

In further, related embodiments, the working chamber may comprise an orifice device for the intake or exhaustion of the working gas, said orifice device comprising an orifice device container, an orifice device piston and an orifice device electrical circuit, said orifice device electrical circuit being electromagnetically coupled to provide a motive force to the orifice device piston, and said orifice device piston being magnetically held in either of two positions within the orifice device container in the absence of electric current in the orifice device electrical circuit. The container and the at least one piston may each comprise a permanent magnet, the permanent magnet of the container and the permanent magnet of the at least one piston being mounted to be mutually repulsive. The container and the at least one piston may be mounted such that the weight of the at least one piston assists a motion of compression during the thermal cycle. The at least one piston may comprise at least one orifice for the intake or exhaustion of the working gas into or out of the working chamber. The at least one orifice may be shielded from the working chamber by the at least one piston for a portion of the thermal cycle. The container may comprise at least one magnetically-permeable spiral element electromagnetically coupled to the electrical circuit. The electrical storage device may comprise at least one of a capacitor and a battery. The container may comprise a cylinder.

In further, related embodiments, the electronic controller may be electronically connected to the electronic power converter to control motion of the at least one piston to perform, in the thermal cycle, both: (i) compressing the working gas over a volume greater than the volume through which the working gas is expanded within the thermal cycle and (ii) exhausting the working gas to a remaining volume less than the smallest volume of compressed gas within the thermal cycle. The electronic controller may be configured to control the at least one piston to perform more than one thermal cycle, and a heat output of any one complete thermal cycle may differ from a heat output of any other complete thermal cycle, of the more than one thermal cycle. The electronic controller may be electronically connected to the electronic power converter to control motion of the at least one piston to perform, in the thermal cycle: an induction stroke wherein working gas flows into the container during a motion of the at least one piston, an adiabatic compression stroke wherein the volume of the working gas is reduced during a motion of the at least one piston over a volume greater than the volume through which the working gas is expanded within the thermal cycle, a cooling period wherein heat flows from the working gas out of the container, an adiabatic expansion stroke wherein the volume of the working gas is increased during a motion of the at least one piston, and an exhaustion stroke wherein the volume of the working gas is reduced to a remaining volume less than the smallest volume of compressed gas within the thermal cycle during a motion of the at least one piston. The electronic controller may be electronically connected to the electronic power converter to control motion of the at least one piston to perform, in the thermal cycle, at least one of, or both of, (i) compressing the working gas over a volume greater than the volume through which the working gas is expanded within the thermal cycle and/or (ii) exhausting the working gas to a remaining volume that is less than the smallest volume of compressed gas within the thermal cycle and that is as small as practicable.

In another embodiment according to the invention, there is provided a method for generating electrical energy using a thermal cycle of a working gas. The method comprises using the motion of at least one piston in a container, containing the working gas performing the thermal cycle, to electromagnetically induce current in an electrical circuit mounted stationary relative to the container, the electrical circuit being electrically connected to an electronic power converter. Electrical energy, produced by the current induced in the electrical circuit, is transferred to an electrical bus electrically connected to the electronic power converter and electrically connected to an electrical storage device. Electrical energy from the electrical bus is transferred to the electrical circuit to electromagnetically provide a motive force to the at least one piston. The transferring the electrical energy to the electrical bus and the transferring the electrical energy from the electrical bus effect a net positive average power transfer from the working gas to the electrical bus over the course of the thermal cycle. The motion of the at least one piston is used to perform, in the thermal cycle, at least one of: (i) expanding the working gas beyond the volume at which compression of the working gas is begun within the thermal cycle or (ii) exhausting the working gas to a remaining volume less than the smallest volume of compressed gas within the thermal cycle.

In further, related embodiments, the method may comprise combusting the working gas in the thermal cycle. The method may further comprise intaking and exhausting the working gas to and from the container, and combusting the working gas in the thermal cycle; or may comprise intaking and exhausting the working gas to and from the container, without combusting the working gas in the thermal cycle. The working gas may be air. The method may further comprise conducting heat energy to the working gas through an exterior surface of the container. The method may comprise using two pistons sharing a common working chamber to perform the thermal cycle. The method may comprise using two pistons in axial opposition to each other to perform the thermal cycle. The method may comprise performing, in the thermal cycle, expansion of the working gas during motion of the pistons away from each other, and at least one of: (i) exhaustion of the working gas during motion of both pistons in the same direction relative to the container or (ii) exhaustion of the working gas while one piston is held at or near a fixed position relative to the container. The method may further comprise controlling the thermal cycle with a binary counter with a state corresponding to each stroke of the thermal cycle, the strokes of the thermal cycle comprising induction, compression, expansion, and exhaustion.

In further, related embodiments, the thermal cycle may comprise strokes of induction, compression, expansion and exhaustion, and a duration of any one of the thermal cycle strokes of induction, compression, expansion, and exhaustion may differ from the duration of any of the other said strokes. A distance traversed by the at least one piston relative to the container in any one of the strokes of induction, compression, expansion, and exhaustion may differ from a distance traversed by the at least one piston relative to the container during any of the other strokes. The method may comprise performing more than one thermal cycle, and a duration of any one complete thermal cycle may differ from a duration of any other complete thermal cycle, of the more than one thermal cycle. The method may comprise intaking and exhausting the working gas through a single orifice in the working chamber. The method may comprise intaking from, and exhausting to, ambient air through the single orifice. The method may comprise combusting the working gas in the thermal cycle, or may be without combustion of the working gas.

In further, related embodiments, the at least one piston may be entirely contained within the container. The method may comprise supporting the at least one piston using a mechanical support rigidly attached to the container that intrudes into the at least one piston. The support may comprise a heat pipe for the transport of heat out of the container. The method may comprise intaking the working gas to, or exhausting the working gas from, the working chamber using an orifice device, said orifice device comprising an orifice device container, an orifice device piston and an orifice device electrical circuit, said orifice device electrical circuit providing a motive force to the orifice device piston, and said orifice device piston being magnetically held in either of two positions within the orifice device container in the absence of electric current in the orifice device electrical circuit. The method may comprise mounting a permanent magnet on the container and mounting a permanent magnet on the at least one piston, the permanent magnet of the container and the permanent magnet of the at least one piston being mounted to be mutually repulsive. The method may comprise using the weight of the at least one piston to oppose a motion of expansion during the thermal cycle. The method may comprise intaking or exhausting the working gas into or out of the working chamber through an orifice in the at least one piston. The method may comprise intaking or exhausting the working gas into or out of the working chamber through at least one orifice, said at least one orifice being shielded from the working chamber by the at least one piston for a portion of the thermal cycle. The method may comprise electromagnetically coupling at least one magnetically-permeable spiral element of the container to the electrical circuit.

In further, related embodiments, an expansion ratio of the working gas may be related to a compression ratio of the working gas only by a temperature rise ratio and an adiabatic constant, the temperature rise ratio being an inherent chemical property of the working gas and being equal to the highest absolute temperature achieved by the working gas in the thermal cycle divided by the absolute temperature of the working gas at the end of the compression stroke of the thermal cycle. The relation of the expansion ratio to the compression ratio may be given by:

$$E/K = \tau^{1/\gamma}$$

where E is the expansion ratio, K is the compression ratio, $\gamma$ is the adiabatic constant and $\tau$ is the temperature rise ratio. A ratio of exhaust gas absolute temperature of the working gas to inlet gas absolute temperature of the working gas may depend only on a temperature rise ratio and on a value of an adiabatic constant, the temperature rise ratio being an inherent chemical property of the working gas and being equal to the highest absolute temperature achieved by the working gas in the thermal cycle divided by the absolute temperature of the working gas at the end of the compression stroke of the thermal cycle. The ratio of exhaust gas absolute temperature to inlet gas absolute temperature may be given by:

$$T_E/T_I = \tau^{1/\gamma}$$

where $T_E$ is the exhaust gas absolute temperature, $T_I$ is the inlet gas absolute temperature, $\gamma$ is the adiabatic constant and $\tau$ is the temperature rise ratio. Efficiency of a device performing the method may be a function only of a temperature rise ratio, a value of an adiabatic constant and a compression ratio of the working gas, the temperature rise ratio being an inherent chemical property of the working gas and being equal to the highest absolute temperature achieved by the working gas in the thermal cycle divided by the absolute temperature of the working gas at the end of the compression stroke of the thermal cycle. Efficiency of a device performing the method may be given by the relation:

$$\eta = 1 - [\gamma(\tau^{(1/\gamma)} - 1)/(K^{(\gamma-1)}(\tau - 1)]$$

where $\eta$ is efficiency, $\gamma$ is the adiabatic constant, $\tau$ is the temperature rise ratio and K is the compression ratio of the working gas.

In further, related embodiments, the working gas may comprise a fuel from the group consisting of: methanol, ethanol, propanol, benzene, octane, hydrogen and ammonia. The working gas may comprise a fuel that does not include carbon. For example, the fuel may comprise hydrogen or ammonia. The electrical storage device may comprise at least one of a capacitor and a battery. The container may comprise a cylinder. The method may comprise performing, in the thermal cycle, both: (i) expanding the working gas beyond the volume at which compression of the working gas is begun within the thermal cycle and (ii) exhausting the working gas to a remaining volume less than the smallest volume of compressed gas within the thermal cycle. The method may comprise performing more than one thermal cycle, wherein an energy output of any one complete thermal cycle differs from an energy output of any other complete thermal cycle, of the more than one thermal cycle. The method may comprise performing, in the thermal cycle: an induction stroke wherein working gas flows into the container during a motion of the at least one piston, an adiabatic compression stroke wherein the volume of the working gas is reduced during a motion of the at least one piston, a heating period wherein the temperature of the working gas rises, an adiabatic expansion stroke wherein the volume of the working gas is increased during a motion of the at least one piston beyond the volume at which compression of the working gas is begun within the thermal cycle, and an exhaustion stroke wherein the volume of the working gas is expelled from the container during a motion of the at least one piston to a remaining volume less than the smallest volume of compressed gas within the thermal cycle. The method may comprise performing, in the thermal cycle, at least one of, or both of, (i) expanding the working gas to atmospheric pressure and/or (ii) exhausting the working gas to a remaining volume that is less than the smallest volume of compressed gas within the thermal cycle and that is as small as practicable.

In another embodiment according to the invention, there is provided a method for pumping heat using electrical energy, the pumping of heat comprising performing a thermal cycle of a working gas. The method comprises using the motion of at least one piston in a container, containing the working gas performing the thermal cycle, to electromagnetically induce current in an electrical circuit mounted stationary relative to the container, the electrical circuit being electrically connected to an electronic power converter. Electrical energy, produced by the current induced in the electrical circuit, is transferred to an electrical bus electrically connected to the electronic power converter and electrically connected to an electrical storage device. Electrical energy is transferred from the electrical bus to the electrical circuit to electromagnetically provide a motive force to the at least one piston. The transferring the electrical energy to the electrical bus and the transferring the electrical energy from the electrical bus effects a net positive average power transfer from the electrical bus to the working gas over the course of the thermal cycle. The motion of the at least one piston is used to perform, in the thermal cycle, at least one of: (i) compressing the working gas over a volume greater than the volume through which the working gas is expanded within the thermal cycle or (ii) exhausting the working gas to a remaining volume less than the smallest volume of compressed gas within the thermal cycle.

In further, related embodiments, the method may comprise intaking and exhausting the working gas from the container through at least one orifice. The working gas may be air. The method may comprise conducting heat energy from the working gas through an exterior surface of the container. The method may comprise using two pistons sharing a common working chamber to perform the thermal cycle. The two pistons may be used in axial opposition to each other to perform the thermal cycle. The method may comprise performing, in the thermal cycle, compression of the working gas during motion of the pistons toward each other, and at least one of: (i) induction of the working gas during motion of both pistons in the same direction relative to the container or (ii) induction of the working gas while one piston is held at or near a fixed position relative to the container. The method may comprise controlling the thermal cycle with a binary counter with a state corresponding to each stroke of the thermal cycle, the strokes of the thermal cycle comprising induction, compression, expansion, and exhaustion.

In further, related embodiments, the method may comprise performing a thermal cycle comprising strokes of induction, compression, expansion and exhaustion, wherein a duration of any one of the thermal cycle strokes of induction, compression, expansion, and exhaustion differs from the duration of any of the other said strokes. A distance traversed by the at least one piston relative to the container in any one of the strokes of induction, compression, expansion, and exhaustion may differ from a distance traversed by the at least one piston relative to the container during any of the other strokes. The method may comprise performing more than one thermal cycle, wherein a duration of any one complete thermal cycle differs from a duration of any other complete thermal cycle, of the more than one thermal cycle. The method may comprise intaking the working gas to, and exhausting the working gas from, the working chamber through a single orifice. The method may comprise intaking from, and exhausting to, ambient air through the single orifice.

In further, related embodiments, the at least one piston may be entirely contained within the container. The method may comprise supporting the at least one piston with a mechanical support rigidly attached to the container that intrudes into the at least one piston. The support may comprise a heat pipe for the transport of heat into or out of the container. The method may comprise intaking the working gas to, or exhausting the working gas from, the working chamber using an orifice device, said orifice device comprising an orifice device container, an orifice device piston and an orifice device electrical circuit, said orifice device electrical circuit being electromagnetically coupled to provide a motive force to the orifice device piston, and said orifice device piston being magnetically held in either of two positions within the orifice device container in the absence of electric current in the orifice device electrical circuit. The method may comprise mounting a permanent magnet on the container and mounting a permanent magnet on the at least one piston, the permanent magnet of the container and the permanent magnet of the at least one piston being mounted to be mutually repulsive. The method may comprise using the weight of the at least one piston to assist a motion of compression during the thermal cycle. The method may comprise intaking or exhausting the working gas into or out of the working chamber through an orifice in the at least one piston. The method may comprise intaking or exhausting the working gas into or out of the working chamber through at least one orifice, said at least one orifice being shielded from the working chamber by the at least one piston for a portion of the thermal cycle.

In further, related embodiments, the method may comprise electromagnetically coupling at least one magnetically-permeable spiral element of the container to the electrical circuit. The electrical storage device may comprise at least one of a capacitor and a battery. The container may comprise a cylinder. The method may comprise performing, in the thermal cycle, both: (i) compressing the working gas over a volume greater than the volume through which the working gas is expanded within the thermal cycle and (ii) exhausting the working gas to a remaining volume less than the smallest volume of compressed gas within the thermal cycle. The method may comprise performing more than one thermal cycle, wherein a heat output of any one complete thermal cycle differs from a heat output of any other complete thermal cycle, of the more than one thermal cycle.

In further, related embodiments, the method may comprise performing, in the thermal cycle: an induction stroke wherein working gas flows into the container during a motion of the at least one piston, an adiabatic compression stroke wherein the volume of the working gas is reduced during a motion of the at least one piston over a volume greater than the volume through which the working gas is expanded within the thermal cycle, a cooling period wherein heat flows from the working gas out of the container, an adiabatic expansion stroke wherein the volume of the working gas is increased during a motion of the at least one piston, and an exhaustion stroke wherein the volume of the working gas is reduced to a remaining volume less than the smallest volume of compressed gas within the thermal cycle during a motion of the at least one piston. The method may comprise performing, in the thermal cycle, at least one of, or both of, (i) compressing the working gas over a volume greater than the volume through which the working gas is expanded within the thermal cycle and/or (ii) exhausting the working gas to a remaining volume that is less than the smallest volume of compressed gas within the thermal cycle and that is as small as practicable.

In another embodiment according to the invention, there is provided a device for generating electrical energy using a plurality of thermal cycles of a plurality of working gases. The device comprises a plurality of containers, a plurality of pistons and a plurality of electrical circuits. At least one of said pistons is movably mounted in each of said containers to form a working chamber between the at least one piston and the said container, the working chamber containing the working gas performing a thermal cycle. One of said electrical circuits is mounted stationary relative to each of said containers, the electrical circuits being electromagnetically coupled to provide motive forces to the at least one pistons. An electronic power converter is electrically connected to the electrical circuits and to an electrical bus. An electrical storage device is electrically connected to the electrical bus. Each of the at least one pistons is movably mounted such that its motion electromagnetically induces current in its associated electrical circuit. An electronic controller is electronically connected to the electronic power converter to control motion of the plurality of pistons to perform, in the thermal cycles, at least one of: (i) expanding each of the working gases beyond the volume at which compression of the working gas is begun within the associated thermal cycle or (ii) exhausting the working gas to a remaining volume less than the smallest volume of compressed gas within the associated thermal cycle. The electronic controller is further electronically connected to the electrical bus to control both (i) flow of electrical energy produced by the currents induced in the electrical circuits to the electrical bus, and (ii) flow of electrical energy from the electrical bus to the electrical circuits to electromagnetically provide the motive forces to the plurality of pistons, and to effect a net positive average power transfer from each of the working gases to the electrical bus over the course of each of the thermal cycles.

In another embodiment according to the invention, there is provided a device for pumping heat using electrical energy, the pumping of heat comprising performing a plurality of thermal cycles of a plurality of working gases. The device comprises a plurality of containers, a plurality of pistons and a plurality of electrical circuits. At least one of said pistons is movably mounted in each of said containers to form a working chamber between the at least one piston and the said container, the working chamber containing the working gas performing a thermal cycle. One of said electrical circuits is mounted stationary relative to each of said containers, the electrical circuits being electromagnetically coupled to provide motive forces to the at least one pistons. An electronic power converter is electrically connected to the electrical circuits and to an electrical bus. An electrical storage device is electrically connected to the electrical bus. Each of the at least one pistons is movably mounted such that its motion electromagnetically induces current in its associated electrical circuit. An electronic controller is electronically connected to the electronic power converter to control motion of the plurality of pistons to perform, in the thermal cycles, at least one of: (i) compressing each of the working gases over a volume greater than the volume through which the working gas is expanded within the associated thermal cycle or (ii) exhausting the working gas to a remaining volume less than the smallest volume of compressed gas within the associated thermal cycle. The electronic controller is further electronically connected to the electrical bus to control both (i) flow of electrical energy produced by the currents induced in the electrical circuits to the electrical bus, and (ii) flow of electrical energy from the electrical bus to the electrical circuits to electromagnetically provide the motive forces to the plurality of pistons, and to effect a net positive average power transfer from the electrical bus to each of the working gases over the course of each of the thermal cycles.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
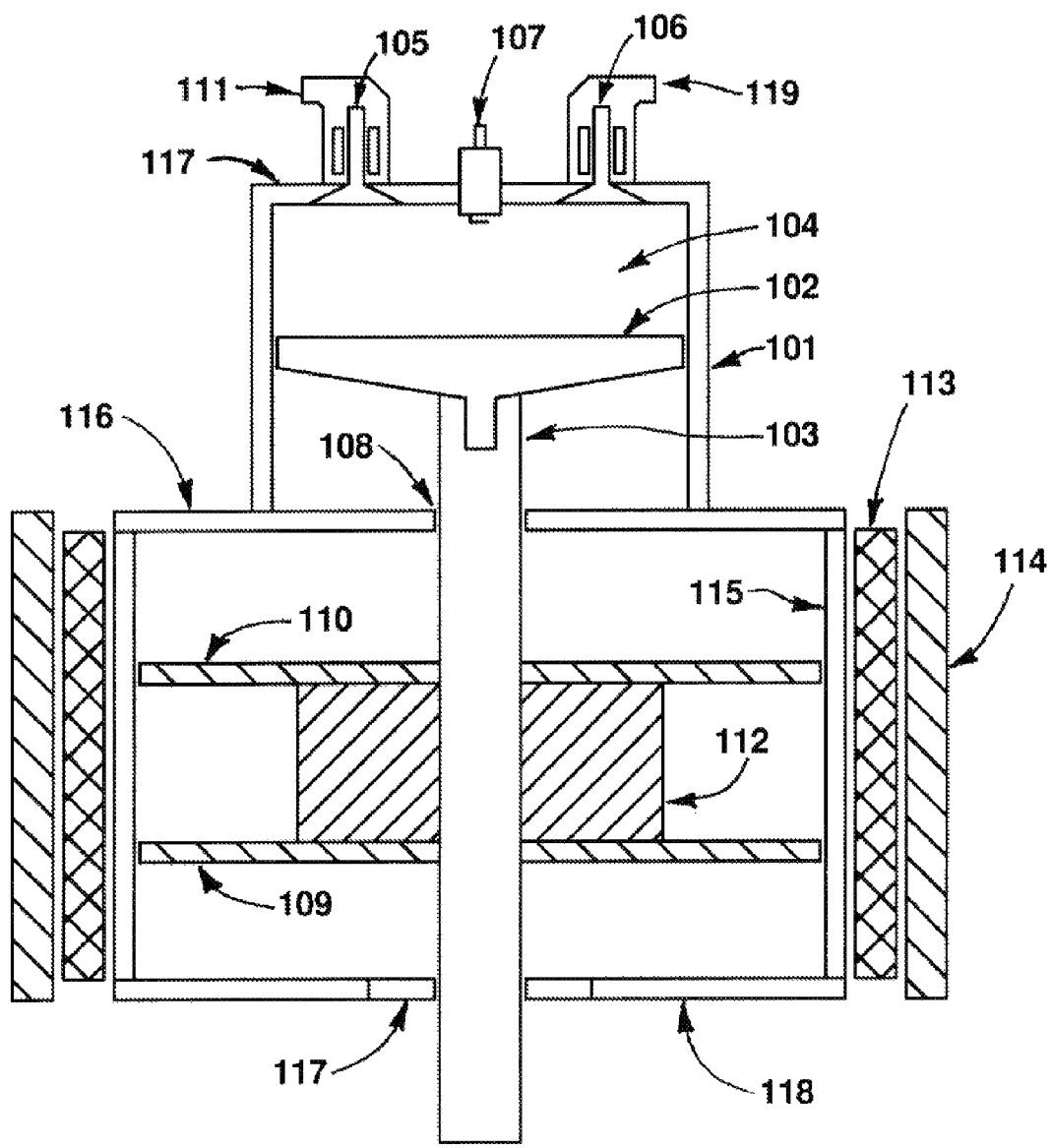
FIG. 1 is a cross-section of a machine to generate electricity from a combustible mixture of gases, in accordance with an embodiment of the invention.

A description of example embodiments of the invention follows.

It is desirable to be able to convert fuel into electricity by means of a method in which the equipment is efficient, reliable, quiet and vibration free, and in which the equipment operates from a variety of fuels.

Rotational inertia has been the method of choice for cyclic energy storage in heat engines since their development in the eighteenth century. Thus, the devices used for cyclically storing and returning energy out of and into the heat engine are typically mechanical. For example, an engine may use the rotational inertia of a crankshaft with flywheel attached for cyclical energy storage. In this way, conventional heat engines can be said to use mechanically-coupled thermal cycles.

However, in such a mechanically-coupled thermal cycle the motion of the pistons is constrained by the motion of the crankshaft. The pistons therefore cannot move in a manner that allows the state of the working gas to closely follow the desired P-V cycle. The relative amounts of time devoted to each segment of the cycle are fixed by the mechanical constraints on the motion of the flywheel. Moreover, mechanically-coupled heat engines are constrained in their reliability and efficiency, the amount of noise and vibration they generate, and their ability to operate from a variety of fuels.

In order to improve on these characteristics, the invention of U.S. Pat. No. 7,690,199 B2 of Wood, entitled "System and Method for Electrically-Coupled Thermal Cycle," the disclosure of which is incorporated herein by reference in its entirety, uses an electricity storage device to accommodate the cyclic flow of energy from a thermal cycle. The thermal cycle can therefore be described as electrically-coupled. An embodiment uses direct electric drive of pistons by means of electromagnetic shear.

An embodiment according to the present invention likewise provides an electrically-coupled heat engine and thermal cycle.

Electricity storage devices suitable for this application include, for example, capacitors, batteries, and (if available) superconducting coils. Direct electric drive using electromagnetic shear may be accomplished with the use of permanent magnets attached to each piston assembly, and with the use of controlled electric currents in coils or windings to provide force to, or electromagnetic induction from, the permanent magnets.

Embodiments of an electrically-coupled thermal cycle may be used for the generation of electricity from a thermal cycle, such as to charge a battery using the combustion of a gas.

In accordance with the invention, power electronic circuits can be built which permit the motion of the pistons to be controlled so as to follow as closely as possible any desired path in the P-V plane. The necessary energy cycling required to extract average power from a heat engine can be effected via electrical energy storage. The use of electric coupling in this manner allows for variation of the amounts of time spent in each segment of a P-V cycle, thereby allowing for high thermal cycle efficiencies.

Therefore, by comparison with prior systems in which energy was cyclically stored mechanically, an embodiment according to the invention uses electrical storage of cyclical energy flow. In addition, use of electronic circuitry allows closed-loop electrical control of piston motion. Open-loop control may also be used.

An embodiment according to the present invention employs electrical storage of cyclical energy flows to and from the thermal cycle. Thus, within a thermal cycle, an embodiment according to the invention cycles energy into and out of an electrical storage device that is electrically coupled to a cylinder containing the piston. Such a use of electrical storage of cyclical energy flow contrasts with the conventional use a form of mechanical resonance for cyclical energy flow, for example when a mechanical resonance is used between the mass of a piston and compressed end-zone gas, which acts as a spring, for cyclical energy flow.

An embodiment according to the invention may use electrical storage of cyclical energy flows to and from the thermal cycle, without mechanical storage of such energy flows. An embodiment according to the invention may be without any attached crankshaft, attached flywheel, moving displacer or other mechanical means of cyclical energy storage attached to the cylinder. For a multiple cylinder machine in accordance with an embodiment of the invention, energy transfer is shared on a common electrical bus.

Implementation of an Internal Combustion Electricity Generator.

a) Mechanical Arrangement

FIG. 1 is a cross-section of a machine to generate electricity from a combustible mixture of gases, such as a conventional air-fuel mixture, in accordance with an embodiment of the invention. A combustion cylinder 101 houses a piston assembly consisting of a piston head 102 attached to a central shaft 103. Between the piston head and one end of the combustion cylinder 101 is a combustion chamber 104. Piercing the combustion cylinder 101 are an inlet valve 105, an exhaust valve 106, and an optional spark plug 107. Although valves are shown here and in other embodiments herein, the term "orifice" is used herein to indicate that other types of openings may be used. In the embodiment of FIG. 1 (and other embodiments herein), a fuel injector could be used in place of the inlet valve. The surface 117 of the combustion cylinder 101 that opposes the piston head 102 is referred to as the cylinder head. These opposing surfaces need not be flat as shown in FIG. 1. Typically, but not necessarily, the inlet valve 105, the exhaust valve 106, and the optional spark plug 107 pierce the cylinder head 117.

Attached to the central shaft 103, away from the piston head 102, is a magnetic shuttle assembly in the form of a spool, consisting of two discs 109 and 110 surrounding the central shaft 103. Between shuttle discs 109 and 110, and surrounding central shaft 103, is an array 112 of permanent magnets. Central shaft 103 is fabricated from a thermally-non-conductive material, whereas piston head 102 may be metallic, and may have a ceramic or other thermally-non-conductive surface coating. Shuttle discs 109 and 110 are made of magnetically-permeable material such as iron or magnet-grade steel.

Surrounding shuttle discs 109 and 110 is a non-magnetic cylinder 115 which serves to support electric windings 113 which are wound on the outside of cylinder 115. Surrounding electric windings 113 is a magnetically-permeable cylinder 114, typically made of laminations of magnet-grade steel. Magnetically-permeable cylinder 114 may have slots to secure or encompass the windings 113, as is the manner in electric machines. Arranged together, magnet array 112, shuttle discs 109 and 110, and laminations 114 form a magnetic circuit, whose flux intersects windings 113. Accordingly, whenever piston head 102 moves axially within combustion cylinder 101, a voltage is induced in windings 113 by the shuttle discs 109 and 110. Conversely, whenever an electric current is passed through windings 113, an axial force is exerted on the shuttle discs 109 and 110 by the windings 113. This force is translated by the central shaft 103 to the piston head 102. Position sensors (not shown in FIG. 1) provide information to an electronic controller.

Winding support cylinder 115 is attached to combustion cylinder 101 by a thermally-insulating disc 116. Attached to the opposing end of winding support cylinder 115 is a shaft support disc 118. Central shaft 103 passes through and is supported by a sleeve bearing 117 located at the inner diameter of shaft support disc 118. Piston head 102 typically features piston rings (not shown in FIG. 1) for mechanical contact with the inside wall of combustion cylinder 101. To avoid mechanical wear, a small clearance is maintained between the inside wall of support cylinder 115 and shuttle discs 109 and 110. Orifice 108 at the inner diameter of insulating disc 116 restricts airflow between the combustion cylinder 101 and the winding support cylinder 115, while maintaining a small clearance between the central shaft 103 and the insulating disc 116, to avoid mechanical wear.

Shaft support disc 118 typically is perforated with a plurality of orifices (not shown in FIG. 1) to allow for atmospheric air flow into and out of winding support cylinder 115, thereby proving air cooling for the magnet array 112. Lower shuttle disc 109 may similarly be perforated with a plurality of orifices (not shown in FIG. 1) to allow for air cooling of the magnet array 112. Air cooling of the magnets may be assisted by a cooling fan (not shown in FIG. 1). Upper shuttle disc 110 may have thermal insulation (not shown in FIG. 1) on its upper surface (facing insulating disc 116) to resist heat flow from the combustion cylinder 101 toward the magnet array 112.

In an alternative embodiment, shaft support disc 118 is omitted from the structure of FIG. 1, and sleeve bearing 117 is located at the center of insulating disc 116, replacing orifice 108.

In FIG. 1 winding support cylinder 115 is depicted as having a larger diameter than combustion cylinder 101. In other embodiments, these two cylinders may have the same diameter, or the combustion cylinder 101 may have a larger diameter than the winding support cylinder 115. An encompassing cylinder or jacket (not shown in FIG. 1) may be located around the combustion cylinder 101 to restrict heat loss from the exterior surface of the combustion cylinder. Inlet valve 105 and exhaust valve 106 may be actuated by electric solenoid action, under control from an electronic controller. 111 depicts an inlet fuel passage, and 119 depicts an exhaust passage.

b) Electrical Arrangement

Figure 2:
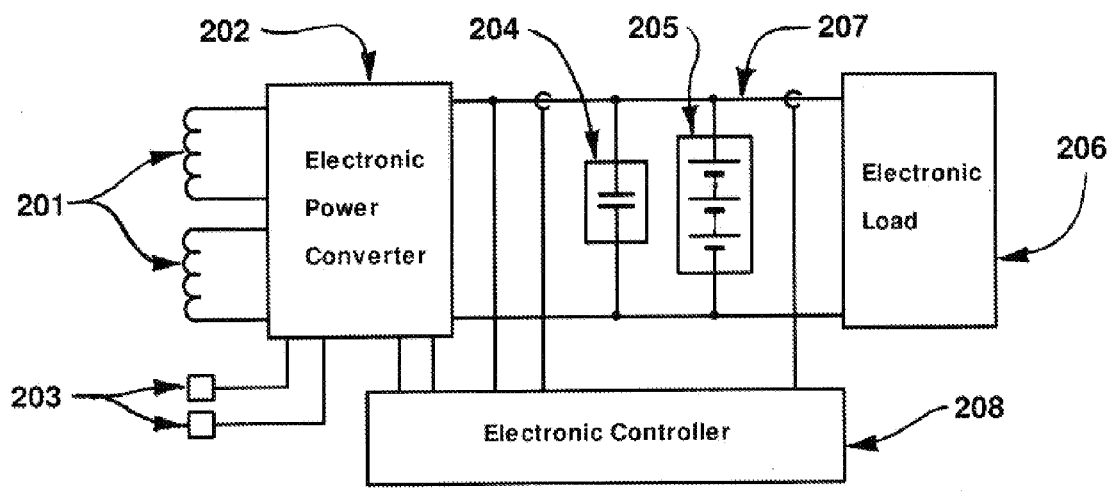
FIG. 2 shows an electrical arrangement for an electrically-coupled heat engine, in accordance with an embodiment of the invention.

FIG. 2 shows the general electrical arrangement of an electrically-coupled heat engine, in accordance with an embodiment of the invention. The windings 201 connect to an electronic power converter 202. FIG. 2 shows two isolated windings for illustrative convenience, but any number of separate windings may be employed, as necessary. Also connected to electronic power converter 202 are signals from an electronic controller 208, which receives signals from position sensors 203. Although two sensors are shown in FIG. 2, any number of position sensors may be employed. The position sensors 203 give the electronic controller 208 the information that it needs for it to know the exact location of the shuttle discs 109 and 110 at any instant in time.

Electronic power converter 202 is also connected to a DC bus 207, to which is also attached a capacitor (or supercapacitor) 204 and a battery 205 and an electric load 206. The electric load may be disconnected from the bus when not required, while the electronic power converter 202 continues to charge the battery 205. Electronic controller 208 also receives current and voltage signals from the DC bus 207, as well as current and voltage signals from the windings 201.

During operation of the system, the electronic controller 208 controls the flow of electric current into and out of the windings in such a manner as to cause the motion of the shuttle to move up and down (i.e., axially) so as to effect energy transfer from an ignited fuel-air mixture in the combustion chamber through the windings, and through the electronic power converter 202 to the electric load 206. The capacitor 204 and battery 205 act as the energy reservoir for the system, and absorb the cyclic energy variations which are integral to the cycles of heat engines. The electronic power converter 202 stores little or no energy, and transfers power between the DC bus 207 and the windings 201 in a highly efficient manner.

c) Thermal Cycle

The operation of a heat engine that employs a quantity of gas as an operating medium may be described by reference to a pressure-volume diagram, hereinafter referred to as a P-V diagram.

Figure 3:
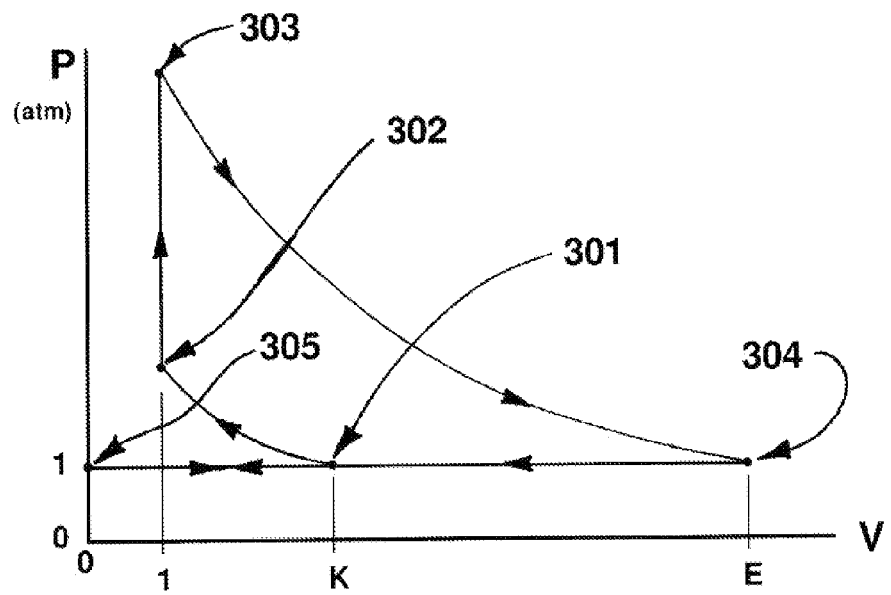
FIG. 3 shows a pressure-volume diagram for advantageous operation of the machine of the embodiments of FIGS. 1 and 2, in accordance with an embodiment of the invention.
Figure 4:
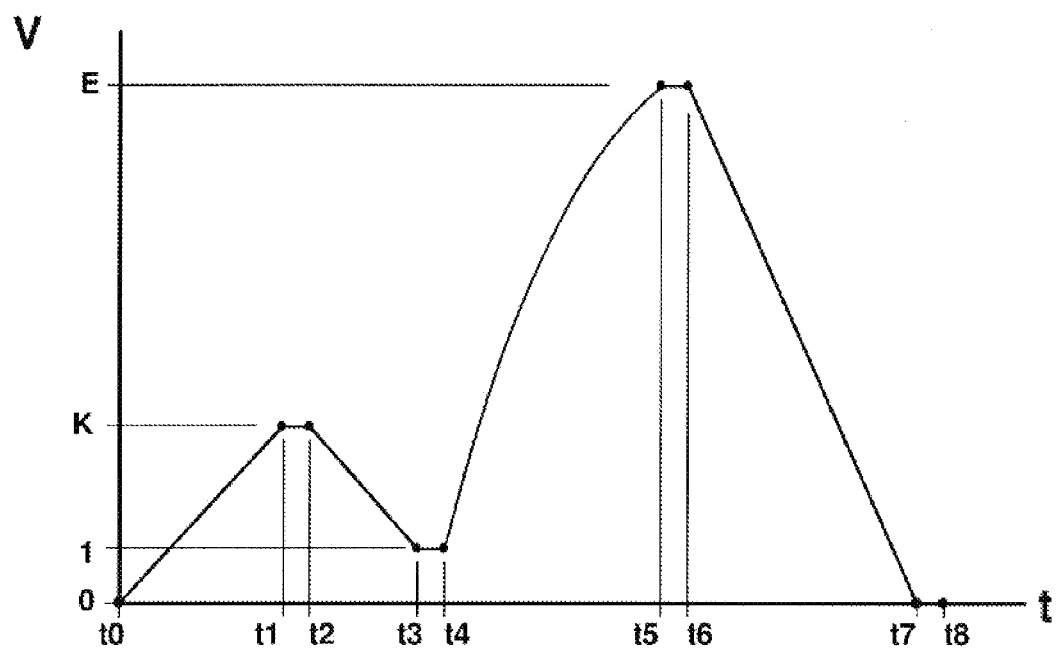
FIG. 4 is a graph of volume versus time in operation of the machine of the embodiments of FIGS. 1 and 2, in accordance with an embodiment of the invention.
Figure 5:
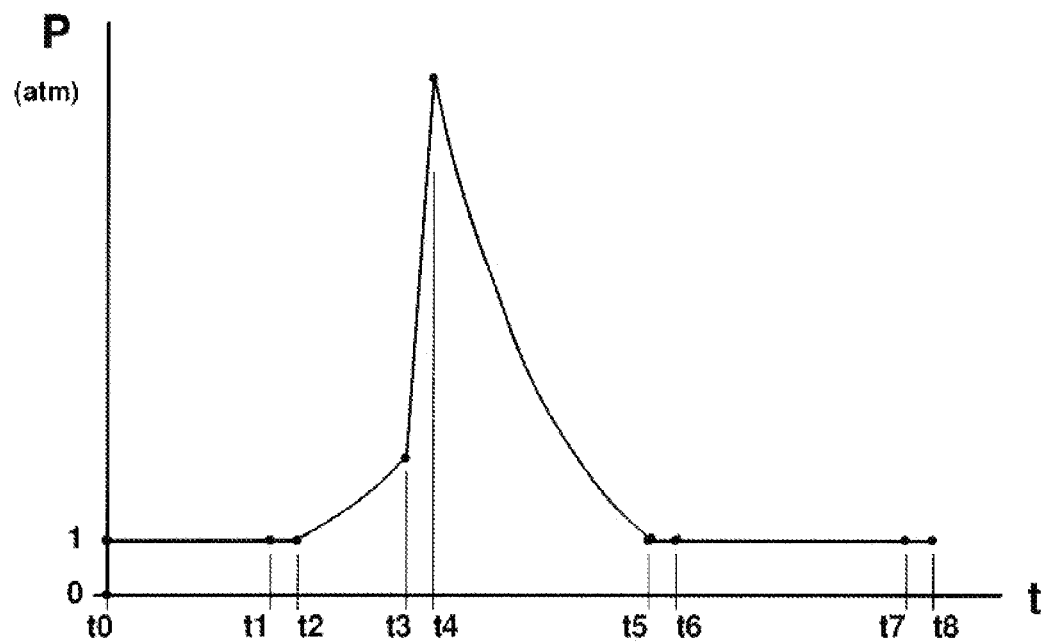
FIG. 5 is a graph of pressure versus time in operation of the machine of the embodiments of FIGS. 1 and 2, in accordance with an embodiment of the invention.

FIG. 3 shows a pressure-volume diagram for advantageous operation of the machine of the embodiments of FIGS. 1 and 2, the Internal Combustion Electricity Generator, hereinafter referred to as the "ICEG," in accordance with an embodiment of the invention. The pressure P represented in FIG. 3 is the pressure within the combustion chamber 104 of FIG. 1, and the volume V represented in FIG. 3 is the volume of gas within that combustion chamber. The cycle of operation depicted in FIG. 3 will hereinafter be referred to as the Complete ICEG Cycle. (Truncated versions of the Cycle will be described below.) Motion in the time domain is depicted in FIGS. 4 and 5, which display volume V and pressure P versus time, in accordance with an embodiment of the invention. In addition to being defined by a P-V cycle, an ICEG Cycle in an embodiment according to the invention may be defined by a time domain sequence.

Consider a single cycle of operation beginning at point 305 in FIG. 3. The volume of gas is zero, indicating that the piston shaft 103 has moved to its uppermost limit, leaving no space at all between piston head 102 and cylinder head 117. (In this explanation it is assumed that the spark plug and valves take up no volume inside the combustion cylinder.) At point 305 in FIG. 3 the pressure is 1 atmosphere, (following an exhaustion stroke at atmospheric Pressure.)

Step i), Induction:

Following closure of the exhaust valve 106 and opening of inlet valve 105, a fuel-air mixture is drawn into the combustion chamber 104 at atmospheric pressure during $t_0$ to $t_1$, until point 301 is reached as determined by the electronic controller 208. Let the volume of the combustion chamber 104 at point 301 be K.

Step ii), Compression:

Following closure of the inlet valve 105 during $t_1$ to $t_2$, and with the exhaust valve 106 remaining closed, the fuel-air mixture is now compressed adiabatically (i.e., with no thermal losses) during $t_2$ to $t_3$ in the combustion chamber 104 until point 302 is reached as determined by the electronic controller 208. Let us arbitrarily define the volume of the combustion chamber 104 at point 302 to be 1 unit.

Step iii), Ignition:

At point 302 the compressed fuel-air mixture is now ignited via the spark plug 107, or is self-detonated in the manner of a diesel engine. The electronic controller 208 initiates no further action until the pressure P has risen maximally to point 303. As indicated in FIGS. 4 and 5, this pressure rise step takes finite time, from $t_3$ to $t_4$.

Step iv), Expansion:

At point 303 the electronic controller 208 initiates an adiabatic expansion of the combusted gas in the combustion chamber 104, until the pressure has fallen during $t_4$ to $t_5$ all the way back to unity (atmospheric pressure) at point 304. Let the volume of the combustion chamber 104 at point 304 be E.

Step v), Exhaustion:

At point 304, exhaust valve 106 is opened during $t_5$ to $t_6$, following which the electronic controller 208 causes upwards motion of the piston shaft 103 during $t_6$ to $t_7$ until all gas in the combustion chamber 104 is exhausted. Exhaust valve 106 is closed from $t_7$ to $t_8$, thereby completing the ICEG cycle. Another cycle may or may not be initiated immediately, as determined by the electronic controller 208.

It should be noted that times taken for each of the major strokes (induction, compression, expansion, exhaustion) need not be the same, as is the case in a conventional internal combustion engine, and may be varied relative to each other by an electronic controller, in accordance with an embodiment of the invention. Note also that with expansion all the way to atmospheric pressure being possible in an embodiment according to the invention, the audible sound of exhaust may be lower than conventional internal combustion engines, and may allow the reduction in size of, or elimination of, the muffler.

Figure 6:
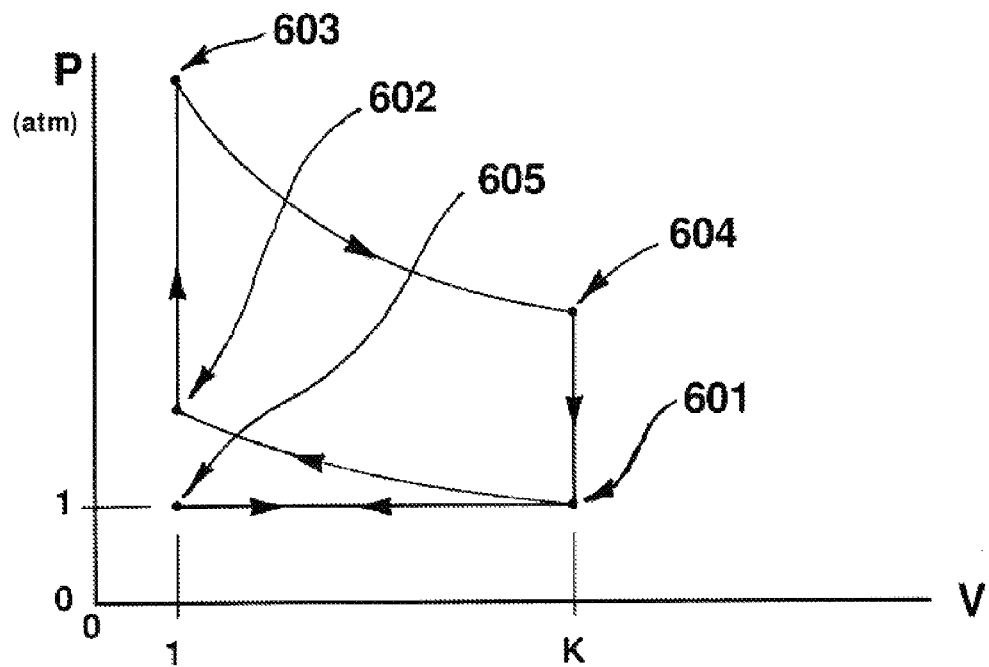
FIG. 6 shows the idealized Otto Cycle for a conventional internal combustion engine.

Comparison with a Conventional Internal Combustion Engine:

FIG. 6 shows the idealized cycle for a conventional internal combustion engine, commonly known as the Otto Cycle. By comparison with the Complete ICEG Cycle of the embodiment of FIG. 3, two differences between the cycles are apparent. (The ignition stage in FIG. 6 between points 602 and 603 corresponds to the ignition stage in FIG. 3 between points 302 and 303.)

A first difference is that for the Otto Cycle, expansion is terminated at point 604 where the expanded volume equals the starting volume at point 601 prior to compression. This represents a loss of energy, some of which is manifest in the explosive exhaust sound in the absence of a muffler, and the rest of which is rejected as waste heat.

A second difference is that for the Otto Cycle, exhaustion at point 605 is incomplete, with some of the exhaust gas mixture remaining in the combustion chamber. This represents a loss of efficiency.

A third difference between the cycle for a real conventional internal combustion engine and the Complete ICEG Cycle is not apparent from the P-V diagrams of FIGS. 3 and 6, but is illustrated in the timing diagrams of FIGS. 4 and 5. This difference results from the dwell periods taken in the Complete ICEG Cycle to ensure that the state actually reaches into the corners of the desired P-V diagram. These dwell periods are $t_1$ to $t_2$, $t_3$ to $t_4$, $t_5$ to $t_6$, and $t_7$ to $t_8$ in FIGS. 4 and 5.

Figure 7:
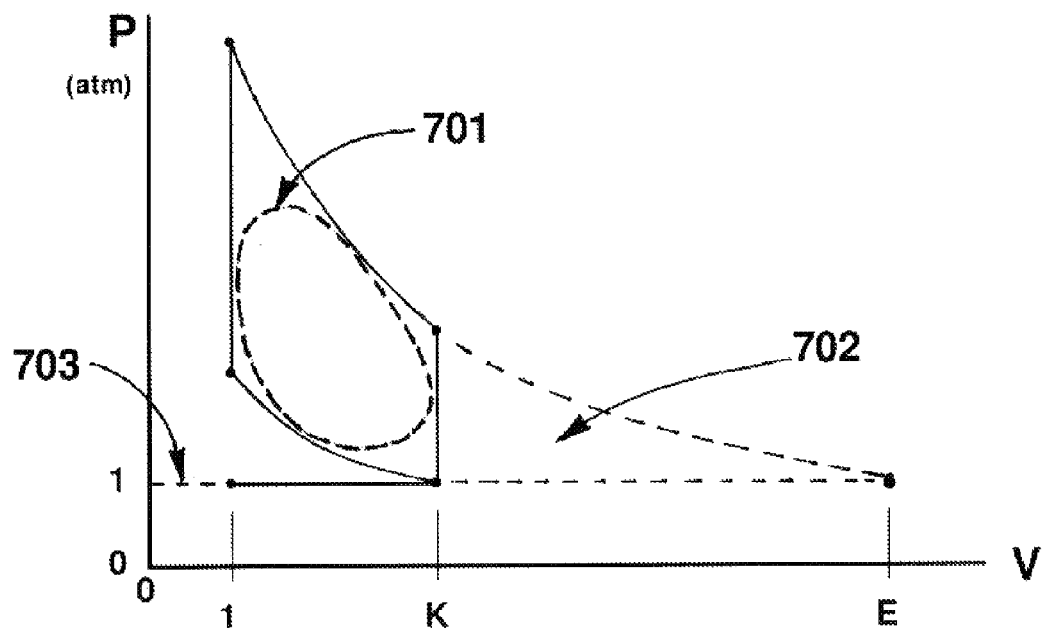
FIG. 7 is a pressure-volume diagram illustrating differences between a complete internal combustion electricity generator cycle in accordance with an embodiment of the invention and the cycle of a conventional internal combustion engine.

Taken together, these three differences between the Complete ICEG Cycle in accordance with an embodiment of the invention and the cycle of a conventional internal combustion engine represent efficiency advantages for the ICEG. FIG. 7 is a pressure-volume diagram illustrating differences between a Complete ICEG cycle in accordance with an embodiment of the invention and the cycle of a conventional internal combustion engine. Interior to the conventional ideal Otto loop is an interior loop 701 showing that, in practice, the state of a conventional internal combustion engine does not reach into the corners, with resulting loss of efficiency. Also shown are the expansion tail 702 and the exhaustion tail 703 of an embodiment according to the invention, both missing from the conventional Otto cycle.

It should be noted that a variety of fuel types can be used with an ICEG according to an embodiment of the invention. In particular, the fuel used in an ICEG may be a fuel that does not include carbon, for example hydrogen or ammonia. Other fuels may be used in an ICEG, for example the fuels discussed in the section that follows.

Thermodynamic Formulae

Without wishing to be bound by theory, some theoretical considerations are set forth here, relating to embodiments described herein. Consider a mass m of ideal gas with specific heat at constant volume $c_v$. Let the absolute temperature of the gas be T. If a quantity $\Delta Q$ of heat is added to that mass m of gas, the resulting temperature rise $\Delta T$ is given by:

$$\Delta Q = m\, c_v \Delta T \quad \text{(Equation 1)}$$

Suppose that the mass m of gas is constrained at constant volume, as is the case between 302 and 303 in FIG. 3. Then the temperature rise $\Delta T$ takes the gas from pressure $P_1$ and temperature $T_1$ to pressure $P_2$ and temperature $T_2$, and $$T_2 = T_1 + \Delta T \quad \text{(Equation 2)}$$

$$P_2/P_1 = T_2/T_1 \quad \text{(Equation 3)}$$

Let $q_m$ be the Specific Combustion Energy of a combustible mixture of gases, e.g., an air-fuel mixture.

$$q_m = \Delta Q/m \quad \text{(Equation 4)}$$

Hence:

$$\Delta T = q_m/c_v \quad \text{(Equation 5)}$$

Then:

$$P_2/P_1 = 1 + q_m/(c_v * T_1) \quad \text{(Equation 6)}$$

We shall use the symbol $\tau$ to denote this ratio of pressures $P_2/P_1$ or temperatures $T_2/T_1$, and we shall refer to $\tau$ as the Temperature Rise Ratio, which is inherent to the chemical properties of the combustible mixture. Thus:

$$\tau = 1 + q_m/(c_v * T_1) \quad \text{(Equation 7)}$$

As an illustrative example for determination of the value of $\tau$, consider a stoichiometric (chemically balanced) mixture of ethanol and air. The chemical equation of combustion is:

$$C_2H_5OH + 3O_2 + 12.9N_2 = 2CO_2 + 3H_2O + 12.9N_2 \quad \text{(Equation 8)}$$

In equation 8, the constitution of air is approximated as 21% oxygen and 79% nitrogen gas, by weight. From reference texts, the calorific value $q_f$ for ethanol is in the vicinity of 28.4 kJ/gm. From equation 8, the ethanol percentage by weight of the stoichiometric mixture is 100×46/503=9.15%. Accordingly, letting a represent the fraction by weight of fuel in the mixture, the calorific value $q_m$ for the ethanol/air mixture is given by Equation 9:

$$q_m = q_f * \alpha \quad \text{(Equation 9)}$$

Thus $q_m$ for the ethanol/air mixture is in the vicinity of 28.4× 0.0915=2.60 kJ/gm. For air, $c_v$=0.712 J/gm·K. Hence, for an assumed inlet gas temperature $T_1$ of 373 K (=100° C.), we have:

$$\tau = 1 + 2,600/(0.712 \times 373)$$

$$= 10.8$$

By way of comparison, Table 1 shows $\tau$ values for seven types of fuel.

TABLE 1

| Fuel | $q_f$ (kJ/gm) | $\alpha$ | $\tau$ |
|---|---|---|---|
| Methanol | 15.1 | 0.1228 | 8.0 |
| Ethanol | 28.4 | 0.0915 | 10.8 |
| Propanol | 42.0 | 0.0805 | 13.7 |
| Benzene | 67.9 | 0.0639 | 17.3 |
| Octane | 113.2 | 0.0565 | 25.1 |
| Hydrogen | 136.2 | 0.0256 | 14.1 |
| Ammonia | 18.6 | 0.1295 | 10.1 |

The $\tau$ values in Table 1 were determined on the same basis as used above for the case of ethanol, and on the following set of corresponding chemical equations:

$$CH_3OH + 1.5O_2 + 6.45N_2 = CO_2 + 2H_2O + 6.45N_2 \quad \text{(Equation 10)}$$

$$C_2H_5OH + 3O_2 + 12.9N_2 = 2CO_2 + 3H_2O + 12.9N_2 \quad \text{(Equation 8)}$$

$$C_3H_7OH + 4.5O_2 + 19.35N_2 = 2CO_2 + 3H_2O + 19.35N_2 \quad \text{(Equation 11)}$$

$$C_6H_6 + 7.5O_2 + 33.25N_2 = 6CO_2 + 3H_2O + 33.25N_2 \quad \text{(Equation 12)}$$

$$C_8H_{18} + 12.5O_2 + 53.75N_2 = 8CO_2 + 9H_2O + 53.75N_2 \quad \text{(Equation 13)}$$

$$2H_2 + O_2 + 4.3N_2 = 2CO_2 + 3H_2O + 4.3N_2 \quad \text{(Equation 14)}$$

$$4NH_3 + 3O_2 + 12.9N_2 = 6H_2O + 14.9N_2 \quad \text{(Equation 15)}$$

For an ideal gas, an adiabatic (thermally lossless) compression or expansion from a point $(P_1, V_1)$ to another point $(P_2, V_2)$ in the P-V plane follows this relationship, $\gamma$ being known as the adiabatic constant:

$$P_1 V_1^\gamma = P_2 V_2^\gamma \quad \text{(Equation 16)}$$

With these relationships in place, formulae for motion around the Complete ICEG Cycle of FIG. 3 are given by Table 2.

TABLE 2

| Point | P | V | T |
|---|---|---|---|
| 301 | 1 | K | $T_1$ |
| 302 | $K^\gamma$ | 1 | $T_1 K^{\gamma-1}$ |
| 303 | $\tau K^\gamma$ | 1 | $\tau T_1 K^{\gamma-1}$ |
| 304 | 1 | $K\tau^{1/\gamma}$ | $T_1 \tau^{1/\gamma}$ |

From Table 2 it follows that:

$$E/K = \tau^{1/\gamma} \quad \text{(Equation 17)}$$

Equation (17) shows that the expansion ratio E is related to the compression ratio K only by the temperature rise ratio $\tau$, an inherent chemical property of the combustible mixture, and on the value of $\gamma$. By way of example for $\tau$=10.8 (per the above for the case of ethanol), and $\gamma$=1.30 (assumed), E/K=6.24, which means that the length of the intake stroke of the Complete ICEG Cycle is 16% of the length of the expansion stroke.

Similarly from Table 2 it follows that:

$$T_{304}/T_{301} = \tau^{1/\gamma} \quad \text{(Equation 18)}$$

Equation (18) shows that the ratio of exhaust gas temperature to inlet gas temperature depends only on the temperature rise ratio $\tau$ and on the value of $\gamma$.

Using the results of Table 2, it can be shown that the efficiency of the Complete ICEG Cycle (i.e., net mechanical work produced divided by thermal energy input) is:

$$\eta_{ICEG} = 1 - \text{Heat Loss/Heat Input} \quad \text{(Equation 19)}$$

$$=1-\gamma(T_4-T_1)/(T_3-T_2) \quad \text{(Equation 20)}$$

$$\text{i.e.: } \eta_{ICEG}=1-[\gamma(\tau^{(1/\gamma)}-1)/(K^{(\gamma-1)}(\tau-1)] \quad \text{(Equation 21)}$$

From equation (21) it can be seen that the efficiency is a function of $\gamma$, $\tau$, and K only.

A well-known result from thermodynamics gives the efficiency of the ideal Otto cycle thus:

$$\eta_{OTTO}=1-1/K^{(\gamma-1)} \quad \text{(Equation 22)}$$

Figure 8:
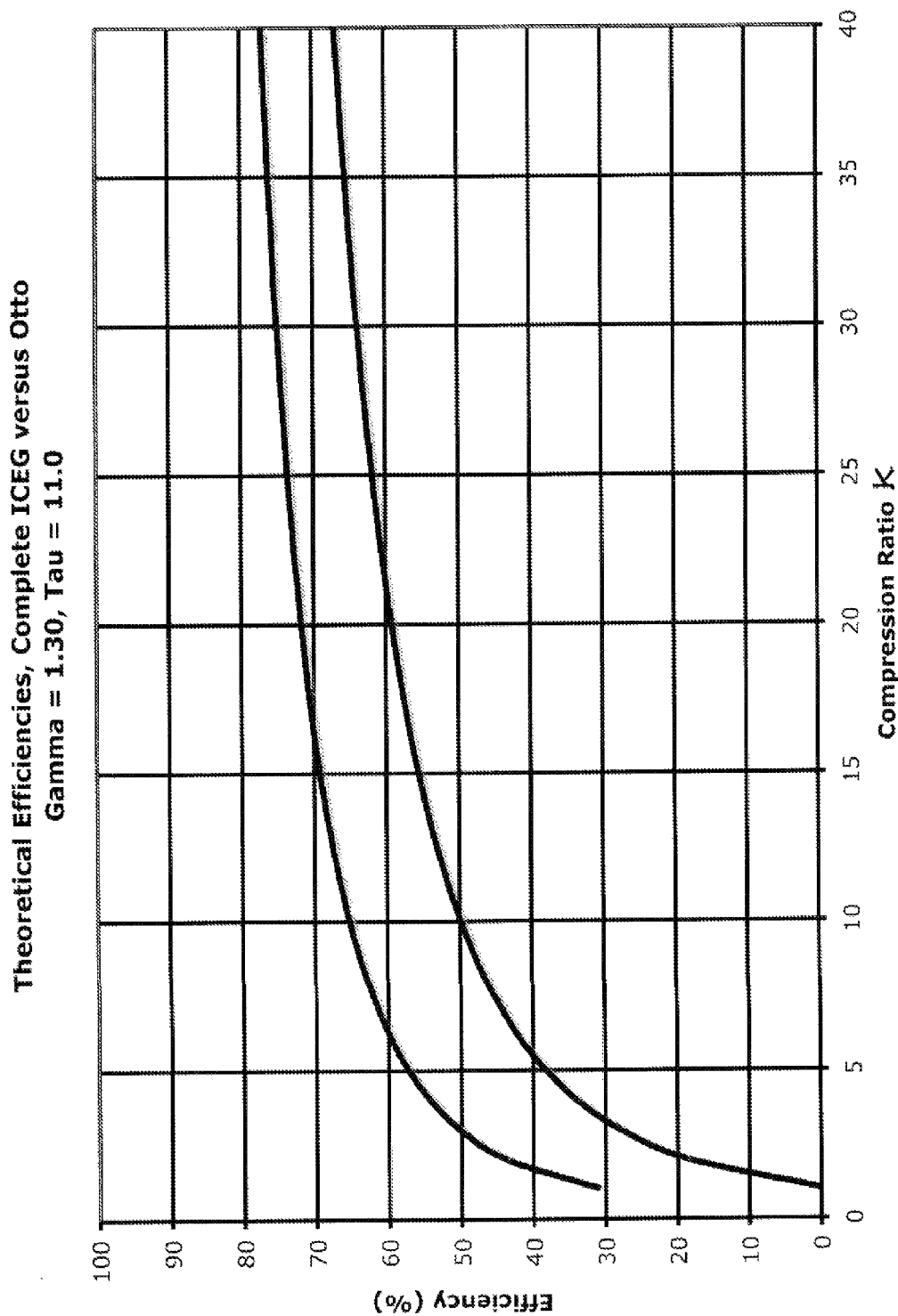
FIG. 8 is a comparative plot of the efficiencies for a complete internal combustion electricity generator cycle in accordance with an embodiment of the invention and for the conventional ideal Otto cycle.

A comparative plot of the efficiencies for the Complete ICEG Cycle in accordance with an embodiment of the invention per the above theory and for the ideal Otto cycle is given in FIG. 8, from which it can be seen that the Complete ICEG Cycle (upper curve) has a higher efficiency than the ideal Otto cycle (lower curve), particularly at low values of compression ratio K.

It should be noted that in accordance with the thermodynamic formulae presented herein, the power conversion efficiency of an ICEG may depend on the Temperature Rise Ratio $\tau$ for the particular fuel used, in accordance with an embodiment of the invention. In particular, the power conversion efficiency of an ICEG increases with increasing values of the Temperature Rise Ratio $\tau$, in accordance with Equation 21.

Variable Energy Output Per Cycle

Figure 9:
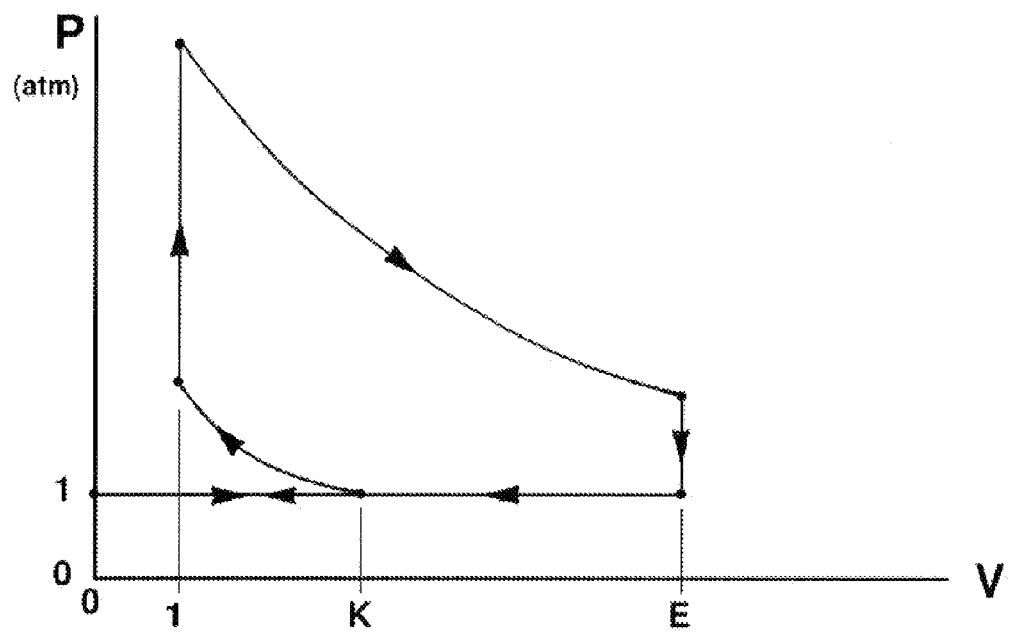
FIG. 9 is a pressure-volume diagram for a cycle using a partially truncated expansion stroke, in accordance with an embodiment of the invention.
Figure 10:
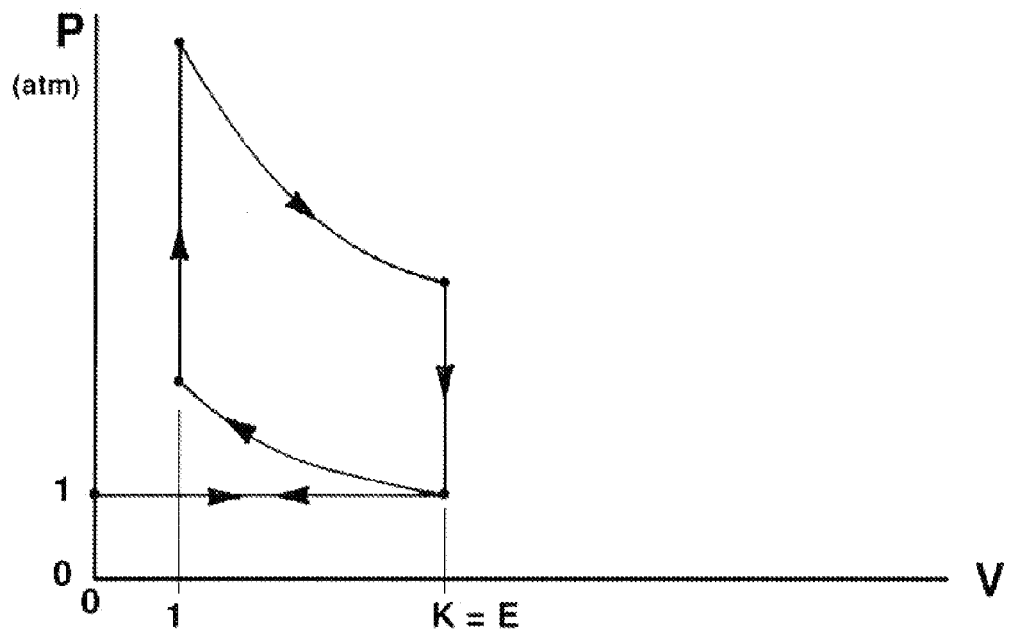
FIG. 10 is a pressure-volume diagram for a cycle using a fully truncated expansion stroke, in accordance with an embodiment of the invention.

The output energy per cycle for an ICEG can be varied by altering the length of the intake stroke (305-301 in FIG. 3), in accordance with an embodiment of the invention. The length of the stroke may be varied in real time by an electronic controller as the engine operates. In any given physical embodiment of an ICEG machine, there will be a practical limit to the expansion distance. If the inlet stroke magnitude is increased beyond the limit imposed by that expansion distance and by equation 10, then it will be necessary to partially truncate the expansion stroke, as shown in FIG. 9, in accordance with an embodiment of the invention. In the limiting case of a fully truncated expansion stroke as shown in the embodiment of FIG. 10, the inlet stroke and expansion stroke are of equal length as in the Otto cycle, but with the notable difference that exhaustion is still complete for the ICEG machine.

Figure 11:
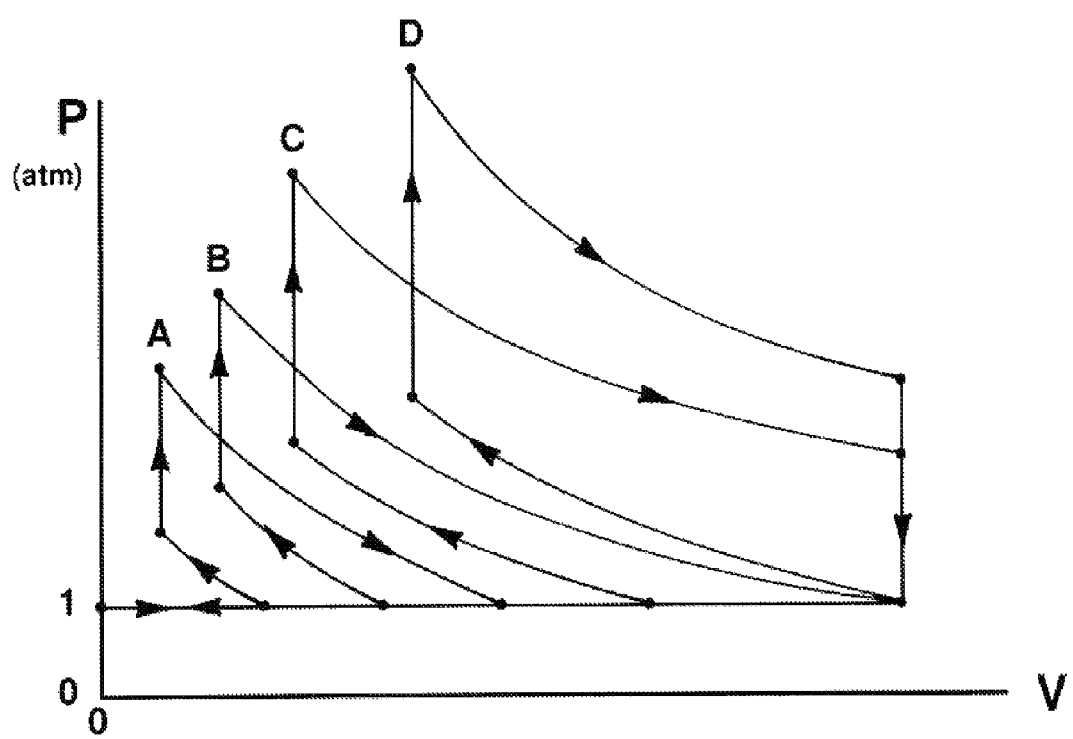
FIG. 11 is a pressure-volume diagram for a family of four internal combustion electricity generator cycles of varying energy content, in accordance with an embodiment of the invention.

FIG. 11 displays a family of four ICEG cycles of varying energy content, in accordance with an embodiment of the invention. The energy content may be varied in real time by an electronic controller as the engine operates. The first two cycles, with pressure peaks at points A and B, are Complete ICEG Cycles. The cycle with pressure peak at point C is a Partially Truncated ICEG Cycle. The cycle with pressure peak at point D is a Fully Truncated ICEG Cycle.

Electronic Controller Implementation

An electronic controller can be implemented for an ICEG to follow the cycle of FIG. 3, without the need for the use of a microprocessor, in accordance with an embodiment of the invention. The absence of a microprocessor in the controller offers the advantages of inherent reliability, fast dynamics, minimal development time, and minimal development cost. Of course, a microprocessor-based controller may supplement or replace the controller described here.

Figure 12:
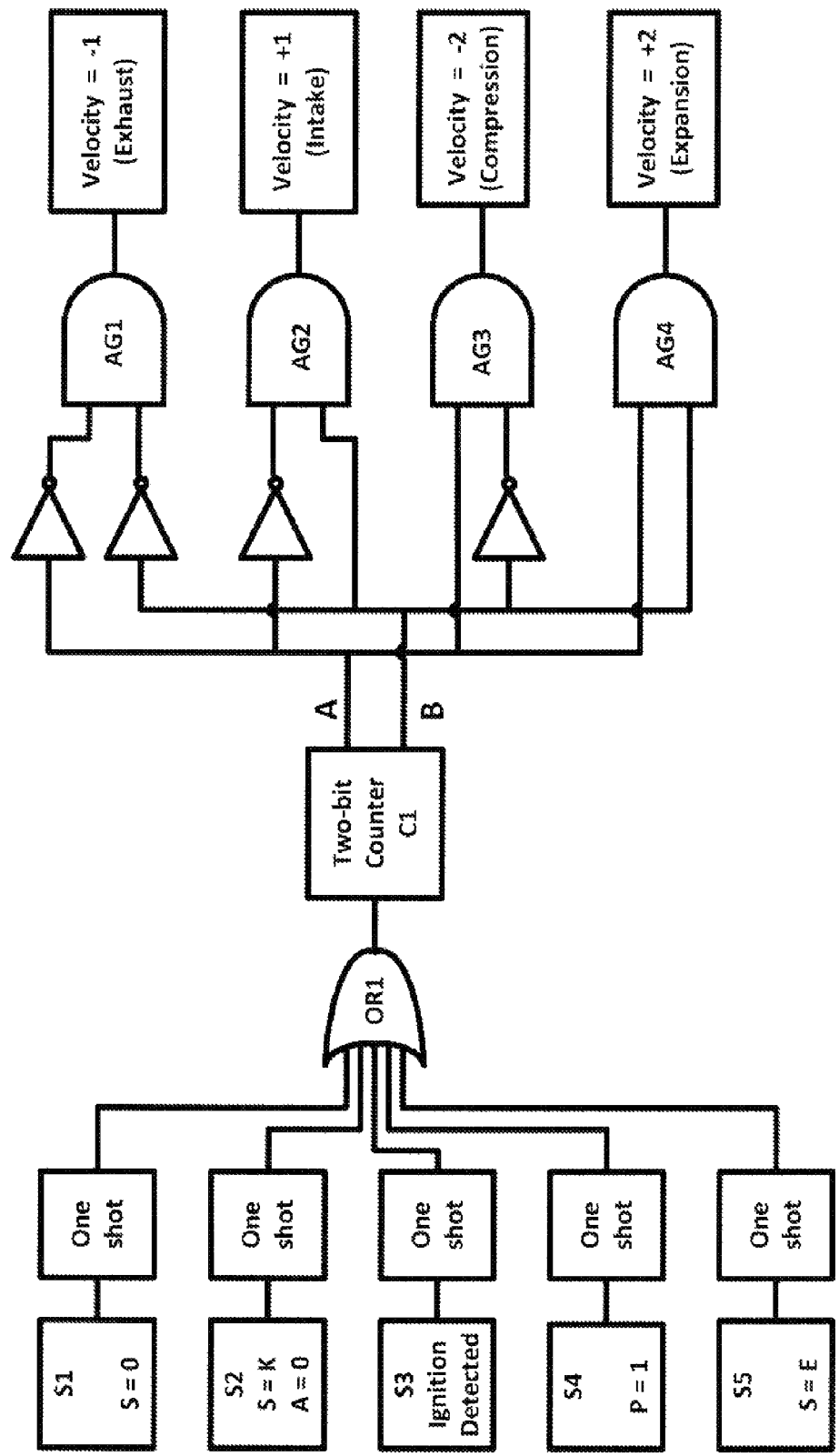
FIG. 12 is a schematic diagram of an electronic controller, in accordance with an embodiment of the invention.

FIG. 12 is a schematic diagram of an electronic controller, in accordance with an embodiment of the invention, and can be used as the basis for either an all-hardware controller implementation, or a microprocessor-based implementation. In FIG. 12, functionality is shown only for the four major motions in the ICEG cycle of FIG. 3, in order to facilitate illustration of the method. The minor motions (dwell periods) can be implemented by techniques discussed below.

The central component of the method of FIG. 12 is a two-bit counter C1, the output [A,B] of which represents each of the four major motion states, as shown in Table 3:

TABLE 3

| A | B | Motion |
|---|---|--------|
| 0 | 0 | Exhaust |
| 0 | 1 | Intake |
| 1 | 0 | Compression |
| 1 | 1 | Expansion |

When counter C1 is in state (0,0), the velocity of the shuttle of FIG. 1 is controlled to be −1, i.e., motion in the negative (volume reduction) direction at a speed of 1 arbitrary speed units. This is the exhaust stroke, 304 to 305 in FIG. 3 and $t_6$ to $t_7$ in FIGS. 4 and 5.

When counter C1 is in state (0,1), the velocity of the shuttle of FIG. 1 is controlled to be +1, i.e., motion in the positive (volume increase) direction at a speed of 1 arbitrary speed units. This is the intake stroke, 305 to 301 in FIG. 3 and $t_0$ to $t_1$ in FIGS. 4 and 5.

When counter C1 is in state (1,0), the velocity of the shuttle of FIG. 1 is controlled to be −2, i.e., motion in the negative (volume reduction) direction at a speed of 2 arbitrary speed units. This is the compression stroke, 301 to 302 in FIG. 3 and $t_2$ to $t_3$ in FIGS. 4 and 5.

When counter C1 is in state (1,1), the velocity of the shuttle of FIG. 1 is controlled to be +2, i.e., motion in the positive (volume increase) direction at a speed of 2 arbitrary speed units. This is the expansion stroke, 303 to 304 in FIG. 3 and $t_4$ to $t_5$ in FIGS. 4 and 5.

As noted elsewhere in this description, the speed of the shuttle need not be held constant at any point of the entire ICEG cycle, nor does the average speed of any stroke need to be constrained in its relationship with any other stroke. In this illustration, the choice of relative speeds for the exhaust and intake strokes is arbitrarily taken as one half of the speeds for the compression and expansion strokes, in order to simplify the description and to illustrate the ability for this system to employ intake and exhaust speeds that are lower than the speeds of the compression and expansion strokes, thereby effecting a reduction in energy losses resulting from higher gas velocities.

At the end of each of the four major strokes, one of the sensors S1 through S5 shown in FIG. 12 changes state, thereby initiating a single pulse from a single pulse generator (or monostable multivibrator, sometimes known in the electronics industry as a "one-shot".) A pulse from any of the one-shot single pulse generators causes the output of OR gate OR1 momentarily to go high, thereby incrementing the count of the two-bit counter C1, and initiating a new major stroke. The minor motions (dwell periods) can be implemented by the use of time delays or sensors acting as inputs to AND gates that are coupled with the sensing elements S1 through S5 of FIG. 12.

Figure 13:
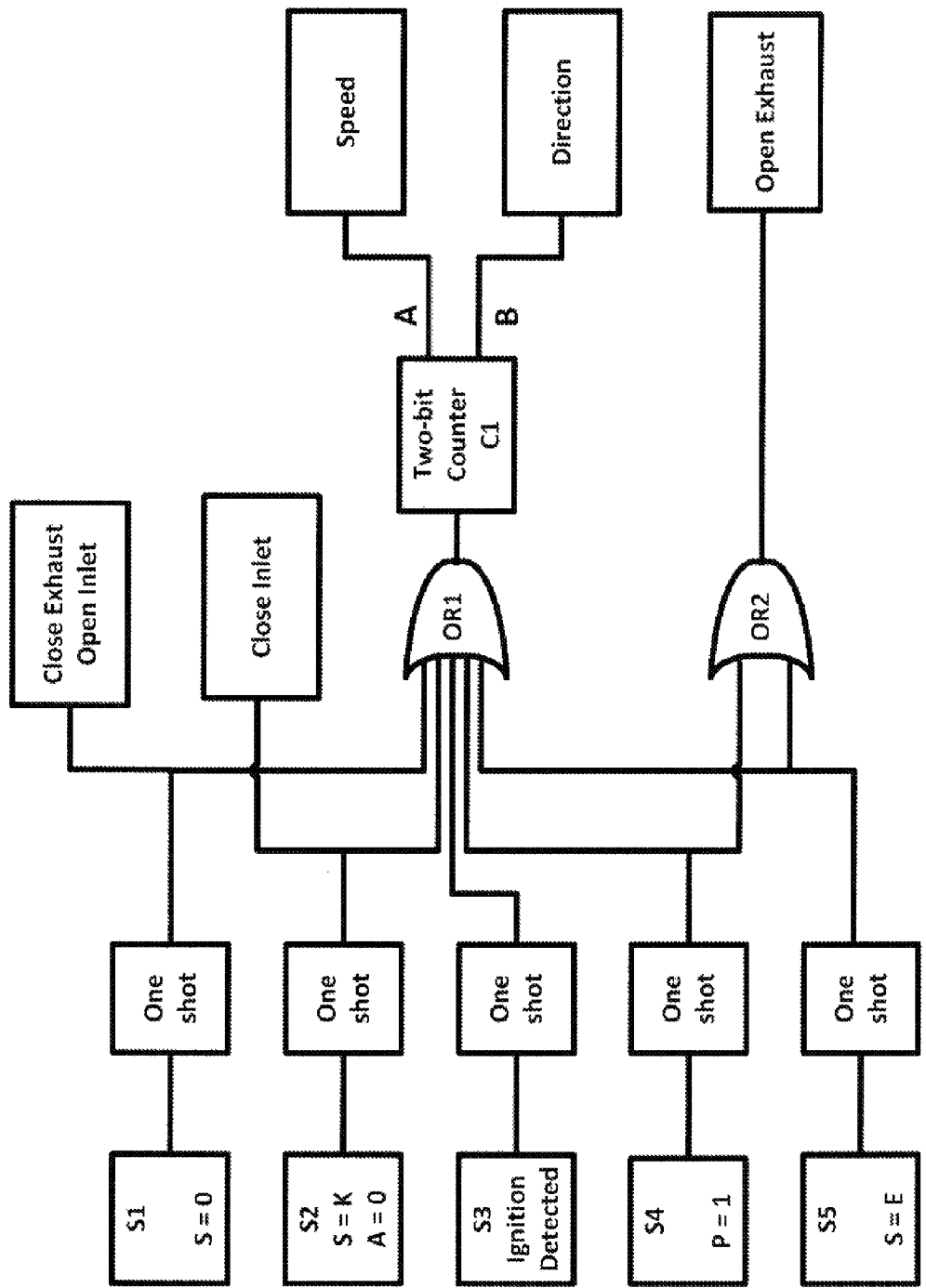
FIG. 13 is a schematic diagram of a simplified electronic controller, in accordance with an embodiment of the invention.

FIG. 13 is a schematic diagram of an electronic controller in accordance with an embodiment of the invention in which a functional simplification of the arrangement of FIG. 12 has been made, obtained by noting that the A output of counter C1 corresponds to the desired speed of the shuttle (1 or 2), while the B output of counter C1 corresponds to the desired direction of the shuttle (+ or −).

Axial Opposition.

Figure 14:
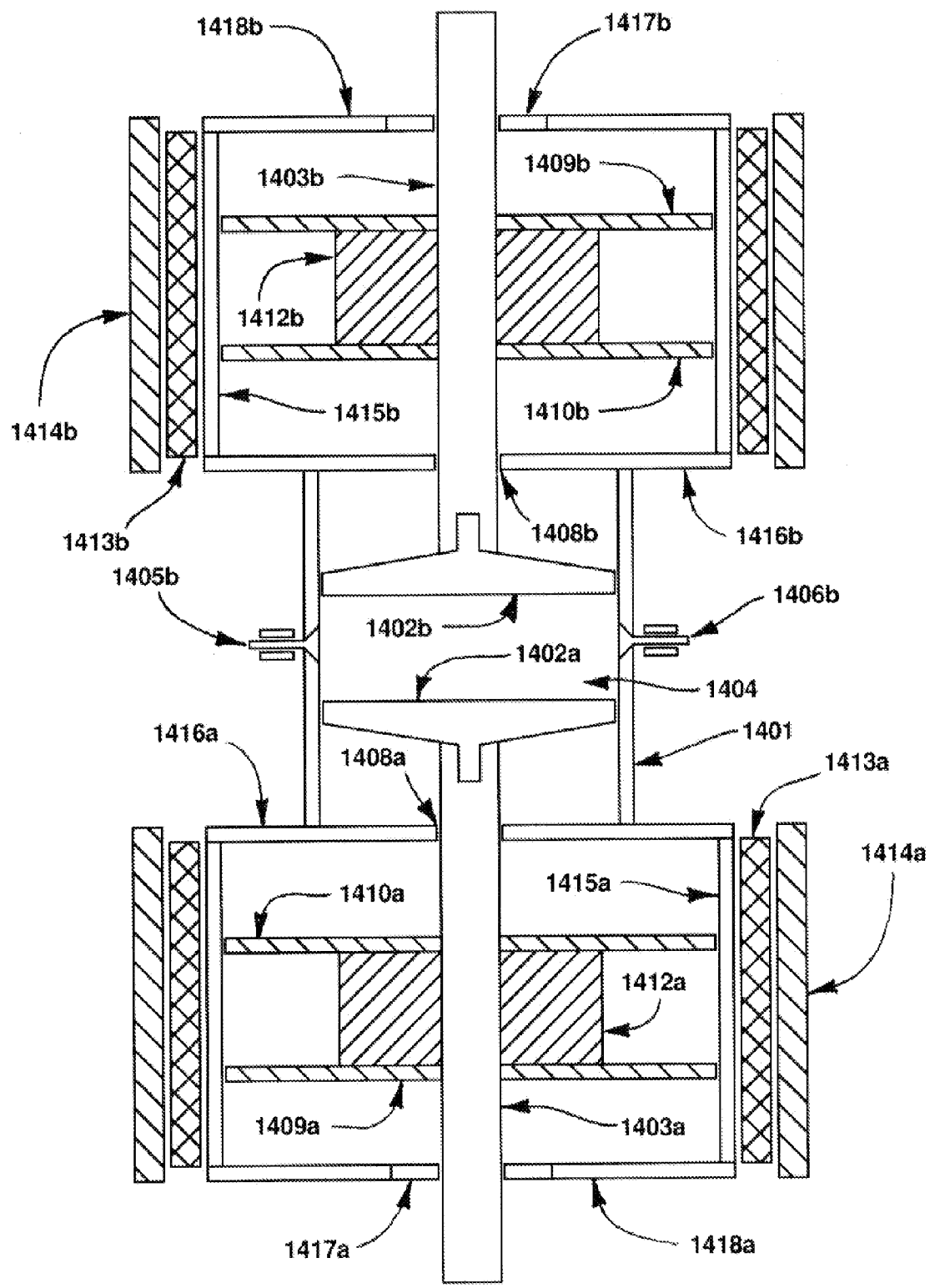
FIG. 14 is a diagram of a machine in which two assemblies of the embodiment of FIG. 1 are integrated to share a common combustion chamber, in accordance with an embodiment of the invention.

FIG. 14 shows an enhancement of the arrangement of the single shuttle scheme of FIG. 1, in accordance with an embodiment of the invention. In this enhancement, two complete (typically but not necessarily identical) shuttle and magnetic assemblies oppose each other in an integrated assembly, each with its associated electrical windings. Items 1402a, 1403a, 1408a, 1409a, 1410a, 1412a, 1413a, 1414a, 1415a, 1416a, 1417a, and 1418a in the lower assembly, and items 1402b, 1403b, 1408b, 1409b, 1410b, 1412b, 1413b, 1414b, 1415b, 1416b, 1417b, and 1418b in the upper assembly correspond respectively to their counterpart items 102, 103, 108, 109, 110, 112, 113, 114, 115, 116, 117, and 118 in FIG. 1, as described above. Thus integrated, the two assemblies share a common combustion chamber 1404, which features side-entry inlet and exhaust valves 1405b and 1406b. The inlet valve 1405b may be a fuel injector. An optional side-entry spark plug may also pierce the combustion chamber 1404. Such a spark plug is not shown in FIG. 14, to illustrate the option of a self-detonating arrangement, as in a diesel engine. Shown below is an alternative placement of the inlet and exhaust valves, in which the two piston heads can approach each other closely, thereby facilitating high compression ratios.

The advantages of an axially opposed arrangement as illustrated in FIG. 14 include:
 i. Mechanical balancing of forces (thereby reducing vibration),
 ii. Elimination of the cylinder head 117 of FIG. 1 with attendant cost savings,
 iii. Facilitation of the use of high compression ratios, since the combustion cylinder 1401 takes the form of a pure cylinder, for which it is easier to ensure adequate strength against high compression forces than is the case if a cylinder head is included.

An electronic controller for the arrangement of FIG. 14 could be a modification of the controller of FIG. 13, wherein a single two-bit counter C1 controls both shuttles, and wherein sensors are located in each assembly, with sensing signals being combined in a logical OR manner, or in a logical AND manner, as appropriate.

The terminology "horizontally opposed" may be used in place of the term "axially opposed."

Compact Shaft Support.

Figure 15:
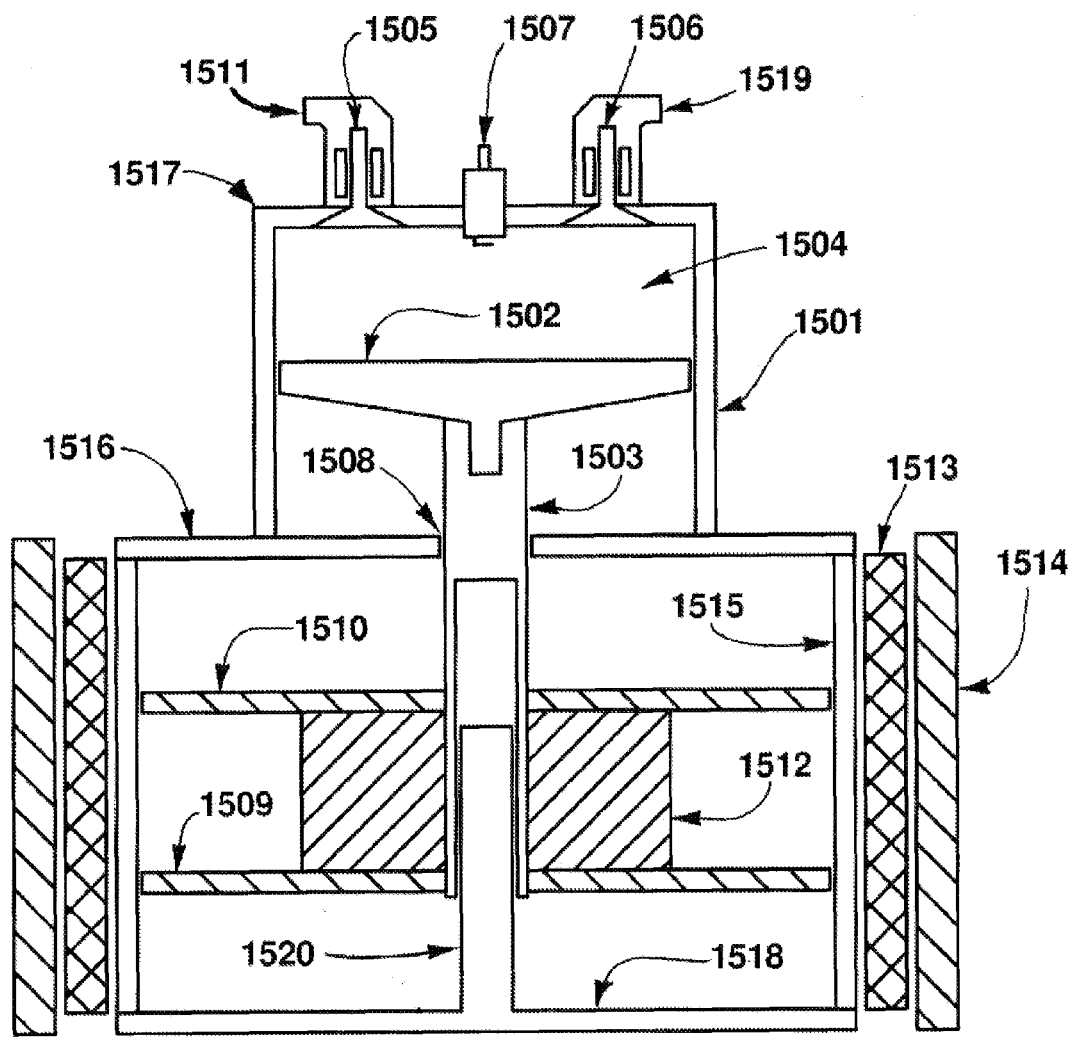
FIG. 15 is a diagram of a machine using a shaft support, in accordance with an embodiment of the invention.

FIG. 15 shows an enhancement of the arrangement of the shuttle support scheme of FIG. 1, in accordance with an embodiment of the invention. In this enhancement, a shaft support 1520 fits inside a hollow central shaft 1503 to provide the lateral support that the sleeve bearing 117 provides in the arrangement of FIG. 1. Items 1501, 1502, 1503, 1504, 1505, 1506, 1507, 1508, 1509, 1510, 1511, 1512, 1513, 1514, 1515, 1516, 1517, 1518, and 1519 correspond respectively to their counterpart items 101, 102, 103, 104, 105, 106, 107, 108, 109, 110, 111, 112, 113, 114, 115, 116, 117, 118, and 119 in FIG. 1, as described above.

The advantages of the arrangement of FIG. 15 include the fact that the overall length required to accommodate the assembly is reduced. Shaft support disc 1518 typically is perforated with a plurality of orifices (not shown in FIG. 15) to allow for atmospheric air flow into and out of winding support cylinder 1515, thereby providing air cooling for the magnet array 1512.

Central Shaft Cooling Method.

Figure 16:
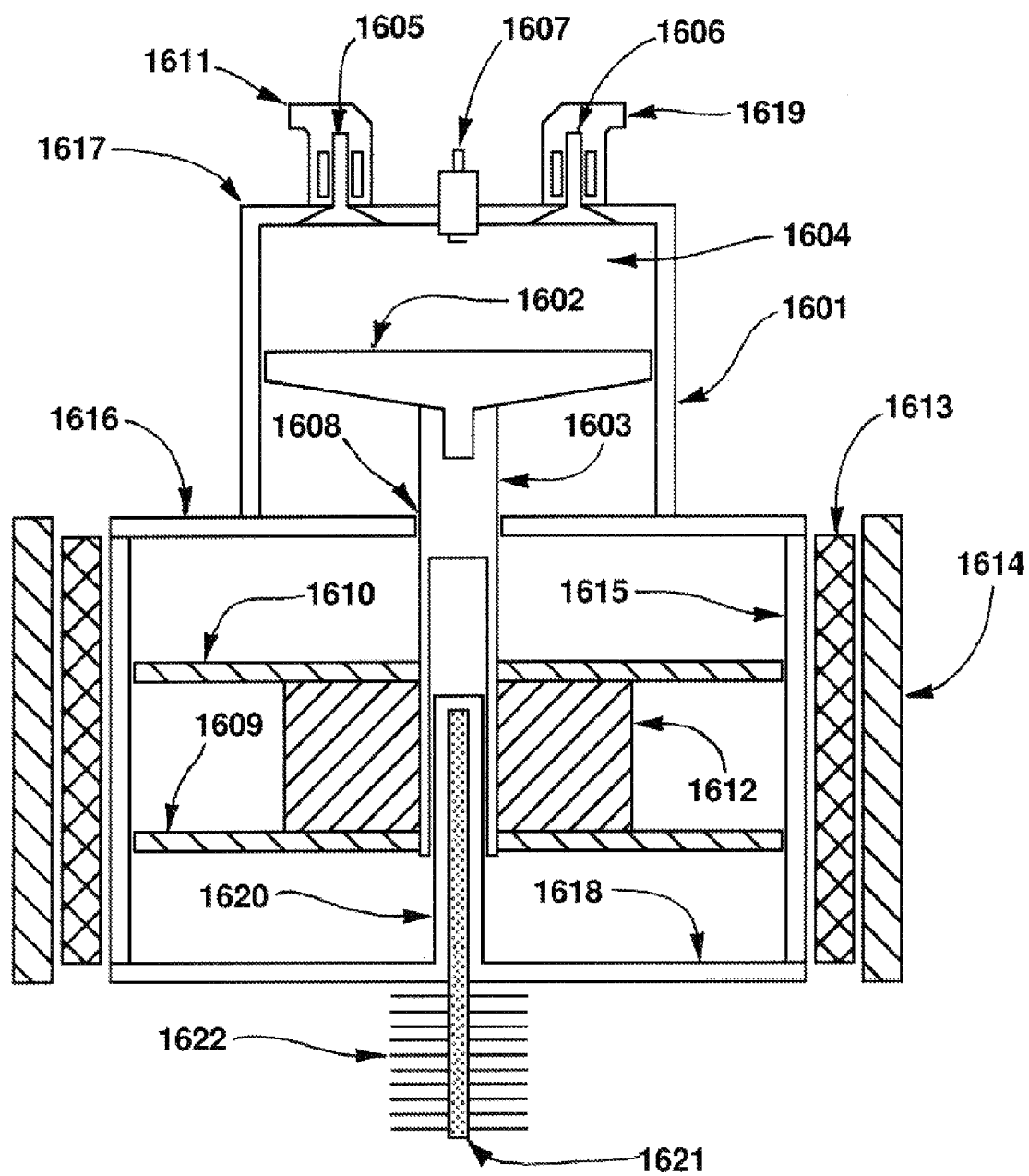
FIG. 16 is a diagram of a machine in which a heat pipe is used to remove heat from a central shaft, in accordance with an embodiment of the invention.

FIG. 16 shows a method for removing heat from the central shaft of the arrangement of FIG. 15, in order to help reduce magnet temperatures, in accordance with an embodiment of the invention. Inside the compact shaft support 1620 is a heat pipe 1621 which rapidly removes heat from the shaft support 1620, thereby drawing heat away from the central shaft 1603, and from the magnet array 1612. A set of cooling fins 1622 is shown as a means for dissipating the heat thus drawn, but other dissipating means can be employed, such as a fluid cooling circuit, or thermal conduction to other portions of the installation. Items 1601, 1602, 1603, 1604, 1605, 1606, 1607, 1608, 1609, 1610, 1611, 1612, 1613, 1614, 1615, 1616, 1617, 1618, and 1619 correspond respectively to their counterpart items 1501, 1502, 1503, 1504, 1505, 1506, 1507, 1508, 1509, 1510, 1511, 1512, 1513, 1514, 1515, 1516, 1517, 1518, and 1519 in FIG. 15, and to their corresponding counterpart items in FIG. 1, as described above.

A heat pipe arrangement similar to the one shown in FIG. 16 can also be employed with the arrangement of FIG. 1, whereby a heat pipe with terminating fins would fit inside the central shaft 103.

First Alternative Location of Valves.

Figure 17:
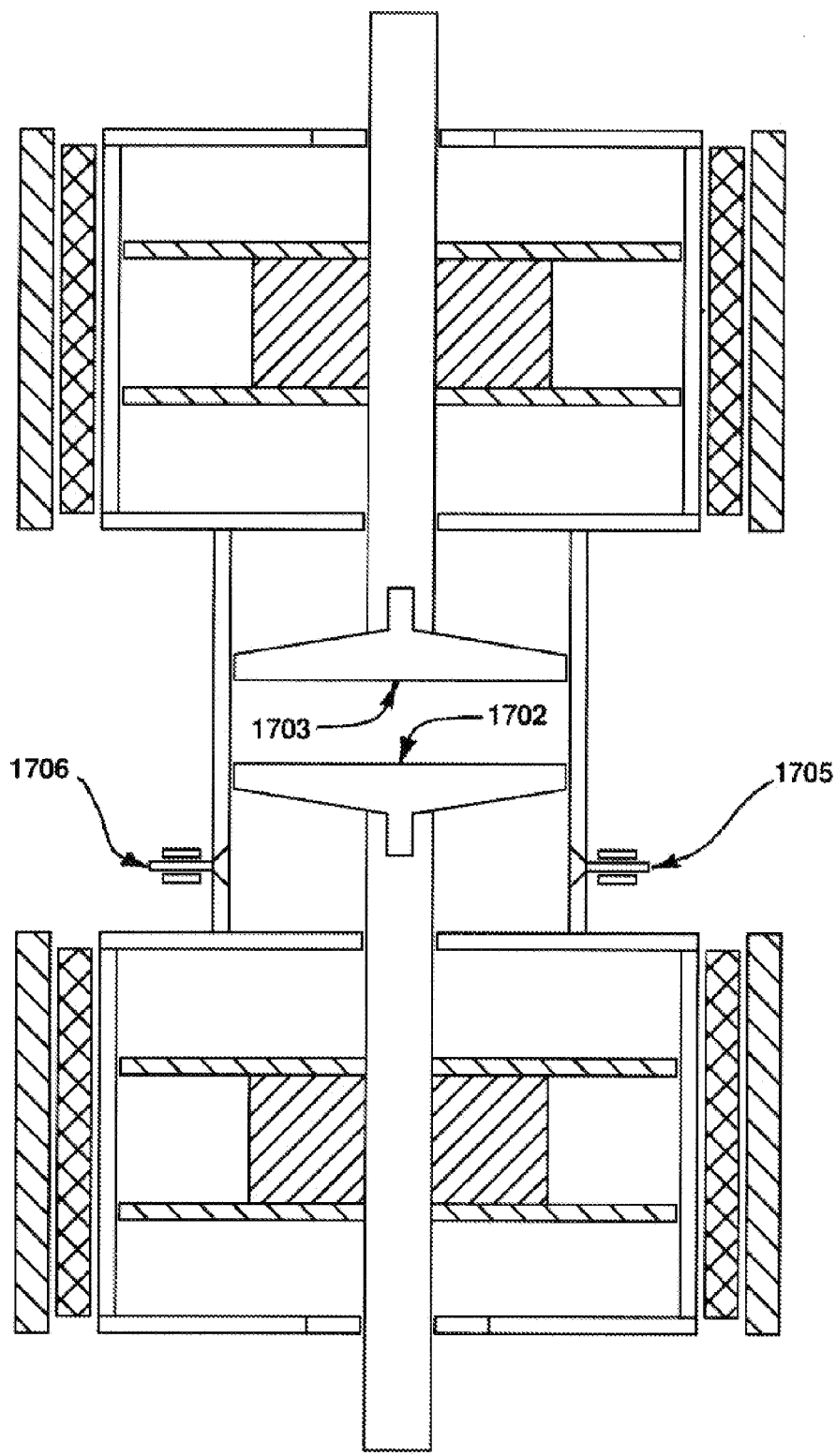
FIG. 17 is a diagram of a machine in which the inlet valve and exhaust valve are located away from the center line of the assembly, asymmetrically disposed, in accordance with an embodiment of the invention.

FIG. 17 shows an alternative arrangement to that of FIG. 14, in which the inlet valve 1705 and exhaust valve 1706 are located away from the center line of the assembly, asymmetrically disposed, in accordance with an embodiment of the invention. The motivation for the arrangement of FIG. 17 is to provide for an exceedingly small volume of the combustion chamber at the time of maximum compression, i.e., at point 302 of the ICEG cycle of FIG. 3. The arrangement of FIG. 17 takes advantage of the fact that the inlet and exhaust valves are only open (in the ICEG cycle) when the pressure in the combustion chamber is atmospheric. Furthermore, when the point of maximum compression has been reached, the inlet and outlet valves have been bypassed by the piston.

Figure 18:
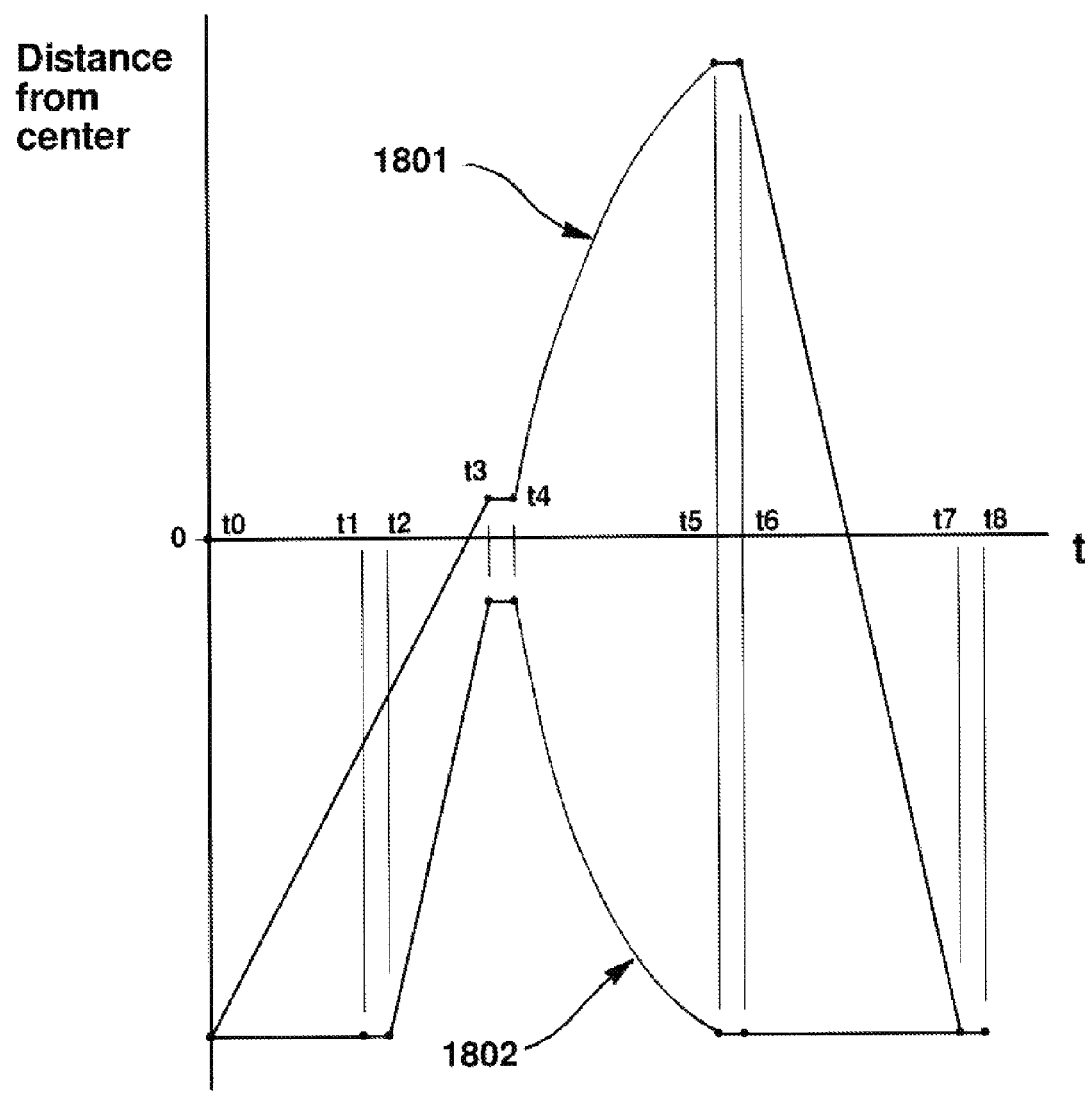
FIG. 18 is a graph of displacement versus time for two pistons performing a complete internal combustion electricity generator cycle in accordance with an embodiment of the invention.

FIG. 18 is a graph of displacement of two piston heads 1702 and 1703 relative to the center line, versus time, so as to accomplish a complete ICEG cycle for the arrangement of FIG. 17, in accordance with an embodiment of the invention. Times $t_0$ through $t_8$ in FIG. 18 correspond with times $t_0$ through $t_8$ in FIGS. 4 and 5. Trajectory 1801 shows the displacement of piston head 1703, and trajectory 1802 shows the displacement of piston head 1702. At the beginning of the ICEG cycle (point 305 in FIG. 3), both piston heads are situated at a low extremity, near the lower level of the inlet and exhaust valves 1705 and 1706. During the interval $t_0$ through $t_1$ with the inlet valve 1705 open, the lower piston head 1702 remains stationary while the upper piston head 1703 moves upward. When an adequate intake volume has been reached at point $t_1$, inlet valve 1702 closes, until $t_2$. Between $t_2$ and $t_3$, upper piston head 1703 continues to move upward, while lower piston head 1702 moves upward in such a manner that when upper piston head 1703 arrives at half the desired compression distance above the center line, lower piston head 1702 arrives at half the desired compression distance below the center line. Between $t_3$ and $t_4$ ignition takes place. Between $t_4$ and $t_5$ expansion occurs, with the two piston heads moving apart at equal speed. Between $t_5$ and $t_6$ the exhaust valve opens. Then, between $t_6$ and $t_7$ exhaustion is accomplished by the downward motion of the upper piston head 1703 while the lower piston head 1702 remains stationary. Between $t_7$ and $t_8$ the exhaust valve closes and the inlet valve opens. Another cycle may or may not be initiated immediately, as determined by the electronic controller 208.

Second Alternative Location of Valves.

Figure 19:
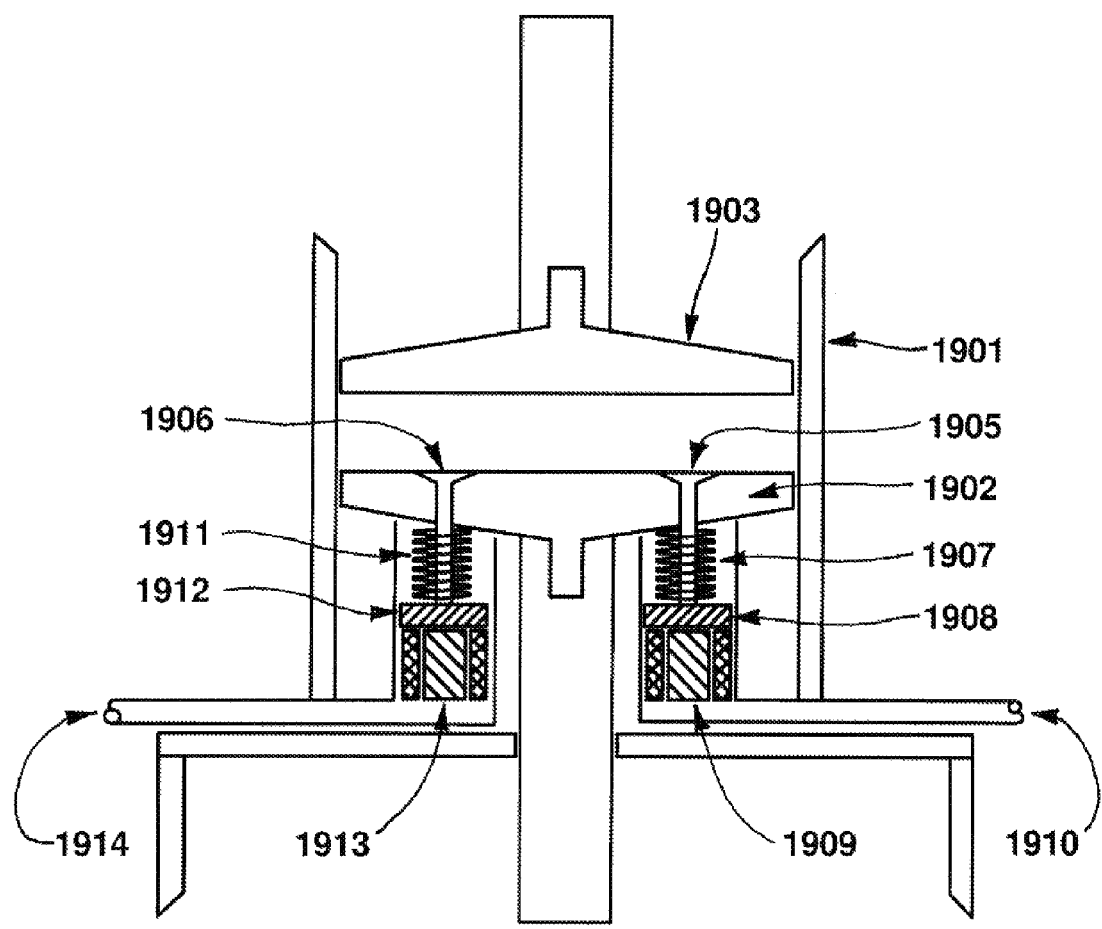
FIG. 19 is a diagram of a machine in which an inlet valve and exhaust valve are integral to a lower piston head, in accordance with an embodiment of the invention.

In the arrangement of FIG. 17, the sealing rings of the piston heads 1702 and 1703 are required to pass by the inlet and exhaust valves 1705 and 1706. This may result in undesirable wear of the sealing rings as they pass over discontinuities in the cylinder wall. FIG. 19 shows another arrangement, in accordance with an embodiment of the invention, wherein the piston heads do not pass over discontinuities in the cylinder wall.

In the embodiment of FIG. 19, inlet valve 1905 and exhaust valve 1906 are integral to the lower piston head 1902, and ride with it. Upper piston head 1903 does not carry valves. The shafts of inlet valve 1905 and exhaust valve 1906 pass through the lower piston head 1902. Springs 1907 and 1911 hold the inlet and exhaust valves closed, except when these springs are compressed by the action of electromagnets 1909 and 1913 acting on permanent magnets 1908 and 1912. Inlet manifold 1910 serves as a duct for incoming air or an air/fuel mixture, while exhaust manifold 1914 serves as a duct for the exhaust gases. An optional fuel injector may pierce the wall of the combustion chamber 1901 at or near the center line of the combustion chamber, Gravity Assisted Energy Capture.

During the expansion stroke (303 to 304 in FIG. 3, and $t_4$ to $t_5$ in FIGS. 4 and 5), the windings 113 have the task of arresting the motion of the shuttle in finite distance. To assist this action, it may be effective in accordance with an embodiment of the invention to mount the complete engine as depicted in FIGS. 1, 15, 16, 28 and 31 in an inverted position, so that during the expansion stroke (303 to 304 in FIG. 3) the kinetic energy of the shuttle is converted in part to potential (gravitational) energy. This potential energy will then be recaptured during the exhaustion stroke (304 to 305 in FIG. 3.)

Magnetically Assisted Energy Capture.

The task of assisting the windings 113 to arrest the motion of the shuttle in finite distance might also be achieved in accordance with an embodiment of the invention by the inclusion of repulsive permanent magnets between the shuttle lower disc 109 and the shaft support disc 118. Kinetic energy retained by the shuttle at the end of the expansion stroke (303 to 304 in FIG. 3) can be captured by the windings during the exhaustion stroke (304 to 305 in FIG. 3) after the shuttle has bounced off the repulsive magnets that are attached to the shaft support disc 118.

Magnetic Bumpers for Lossless Resting.

In the gravity assisted energy capture arrangement described above, it may be advantageous to include repulsive permanent magnets between the shuttle upper disc 110 (which will actually occupy the physically lower position in the inverted arrangement) and the insulating disc 116, in accordance with an embodiment of the invention. This will permit the indefinite resting of the shuttle between energy-conversion cycles (i.e., after the exhaustion stroke 304 to 305 and before the induction stroke 305 to 301) without the consumption of energy, and without mechanical contact.

Magnetically Bistable Valves.

Figure 20:
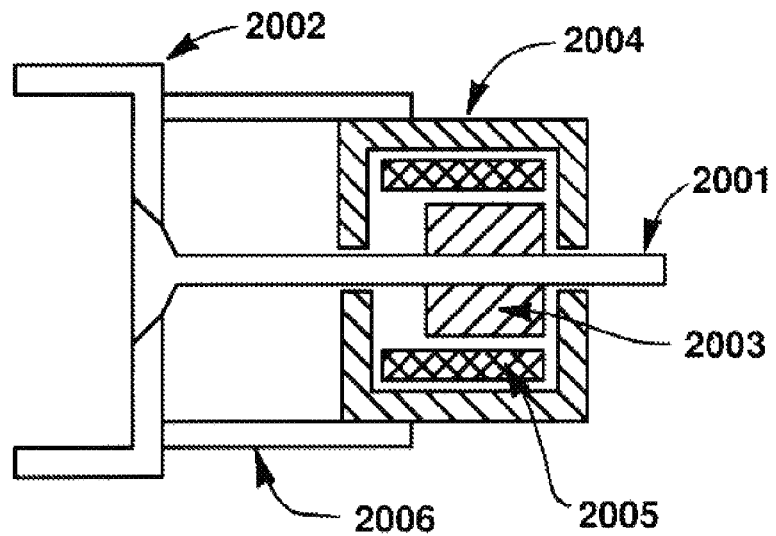
FIG. 20 is a diagram of a magnetically bistable valve, in accordance with an embodiment of the invention.

FIG. 20 is a diagram of an arrangement for the operation of a valve (inlet or exhaust) with minimal energy consumption, in accordance with an embodiment of the invention. Valve 2001 pierces a cylinder head 2002 (alternatively, a cylinder wall.) Attached to and surrounding the shaft of valve 2001 is a cylindrical magnet array 2003. Surrounding magnet array 2003 is a winding (or windings) 2005 housed within a magnetically-permeable casement 2004, through which the valve 2001 can slide freely. Casement 2004 is rigidly anchored to the cylinder head 2002 by an attachment 2006.

Cylindrical magnet array 2003 is shorter in length than casement 2004, and by magnetic attraction will attach itself to either end of casement 2004. A pulse of current of appropriate amplitude, polarity, and duration will dislodge cylindrical magnet array 2003 from whichever end of casement 2004 to which it is attached, and will cause cylindrical magnet array 2003 to move to and remain at the opposite end of casement 2004. Immediately following cessation of the dislodging pulse of current, and while the cylindrical magnet array 2003 is still in motion, an applied driving voltage of opposite polarity to the dislodging voltage is applied to the winding 2005. This reverse-polarity connection, with suitable drive electronics, will result in a return to the electrical supply of most the energy used in dislodgement of the cylindrical magnet array 2003.

Periodic and Aperiodic Cycles.

With reference to FIGS. 3 and 11, a new cycle may or may not be initiated immediately following the completion of any one cycle, in accordance with an embodiment of the invention. If a new cycle is initiated without delay, and if all cycles are identical, then fixed-frequency operation of an engine will result. Similarly, if a fixed time delay is inserted between each cycle and if all cycles are identical then fixed-frequency operation of an engine will again result. Average power output can be varied either by altering the time delay between cycles, or by varying the energy output per cycle as explained above or by a combination of both methods, in accordance with an embodiment of the invention.

In cases where fixed-frequency operation results in a noisome droning or resonance, the ICEG can be operated in a non-periodic manner, wherein successful cycles are of differing energy content, or of differing duration, or of differing time separation, in accordance with an embodiment of the invention. This variation would be effected by the electronic controller, which may employ a pseudo-random sequence generator, or the action of a chaotically-behaved circuit, or a noise generator, in order to generate a sequence of cycles that is aperiodic, while maintaining a desired average power output.

Winding Arrangement.

Figure 21:
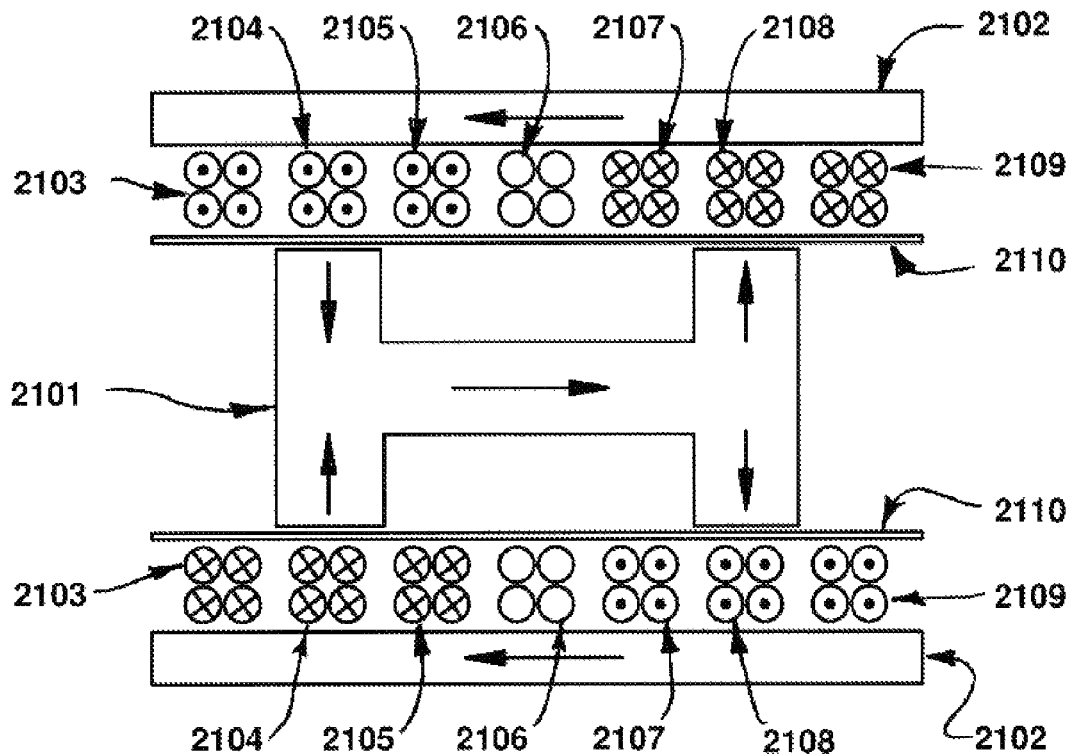
FIG. 21 is a diagram of windings for use in an internal combustion electricity generator, in accordance with an embodiment of the invention.

FIG. 21 shows a simplified arrangement of windings for use in an ICEG, in accordance with an embodiment of the invention. Such an arrangement may be referred to as a tubular synchronous motor, in accordance with an embodiment of the invention. Shuttle bobbin 2101 is made from permanent magnets and magnetically-permeable material, typically as described above in connection with FIG. 1. Between bobbin 2101 and magnetically-permeable cylinder 2102 are coils of wire 2103 through 2109, wound on a non-magnetic non-conducting thin cylinder 2110. In FIG. 21, the arrows marked on bobbin 2101 indicate the direction of the magnetic flux within the bobbin, and the arrows marked on cylinder 2102 indicate the direction of the magnetic flux within the cylinder. It is understood that shuttle bobbin 2101 in FIG. 21 performs the function of the shuttle bobbins shown in FIGS. 1,14, 15, 16, and 17.

As drawn in FIG. 21, each coil has four turns of wire, but any number of turns can be employed for each coil, in any number of layers of wire. Gaps shown between the coils are shown in FIG. 21 for clarity, but are not necessary, and would typically be omitted in practice. At the instant depicted, current flows in all coils except 2106. The standard convention is followed here for indicating current direction, namely, that a dot within a circle indicates a single wire with current flowing toward the viewer, and that a cross within a circle indicates a single wire with current flowing away from the viewer. As a combined result of the flux cutting through coils 2104 and 2108 and the simultaneous flow of current within those coils, a force (leftwards) will be exerted on the bobbin. Likewise, if the bobbin has velocity in either direction at the instant shown, a voltage will be induced in windings 2104 and 2108.

Figure 22:
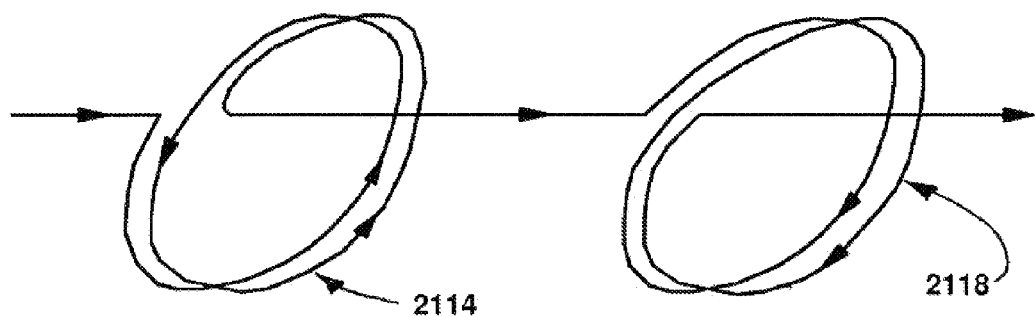
FIG. 22 is a diagram of coils connected electrically in series, in accordance with an embodiment of the invention.

In order to arrange that coils 2104 and 2108 have the same magnitude of current flowing in them at any instant of time and in the correct directions, coils 2104 and 2108 are connected electrically in series as illustrated in the manner of the embodiment of FIG. 22, wherein only two turns per coil are shown for ease of interpretation. From FIG. 22 it can be seen that the turns of coils 2104 and 2108 are wrapped around cylinder 2110 in opposing directions. Other coils (further along in the axial direction) can be placed in series with the coils depicted in FIG. 22, with alternating winding directions. Semiconductor switches can be used to steer current flow through only those coils that are active, i.e., that are cutting flux from the flanges of the shuttle bobbin. The switches can control individual coils, or pairs of coils, or groups of coils.

Figure 23:
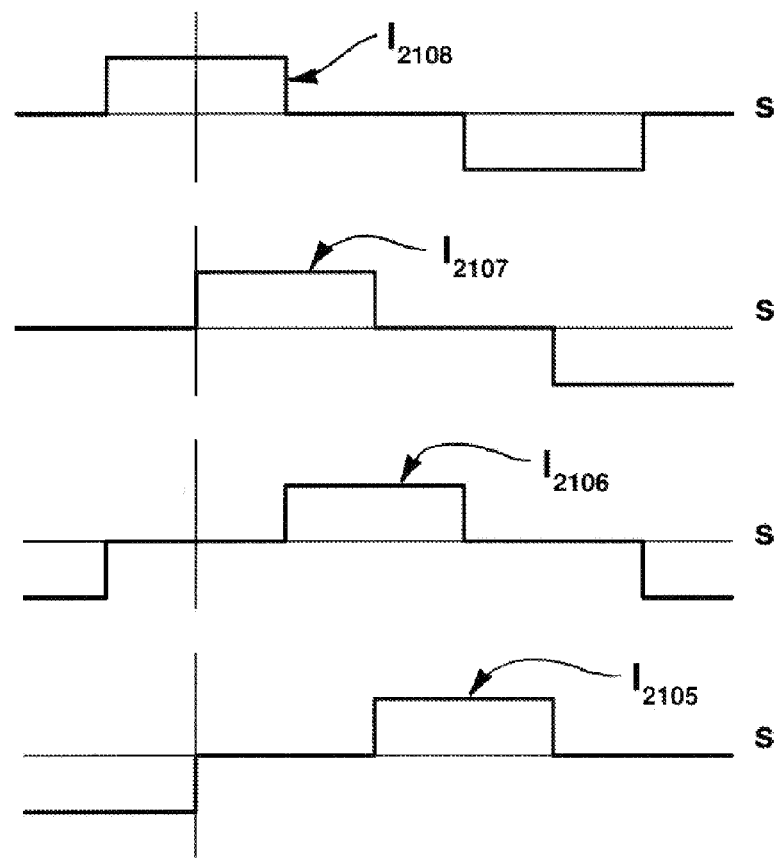
FIG. 23 is a set of graphs of coil currents, plotted in amplitude versus shuttle distance, in accordance with an embodiment of the invention.

For the instant depicted in FIG. 21, it can be seen that current flow in coil 2106 is not required in order to produce an axial force on bobbin 2101. It can also be seen that if bobbin 2101 is allowed to move leftwards by four coil pitches such that its right-hand flange is aligned with coil 2104, then the current direction in coil 2104 will need to be reversed from that shown, in order to produce a continuation of force in the leftwards direction. FIG. 23 shows a sequence of the four sets of coil currents (plotted in amplitude versus axial shuttle distance s) such that axial motion of the bobbin will continue smoothly and without interruption, in accordance with an embodiment of the invention. Not shown in FIGS. 21 and 22 are position-sensing devices to provide synchronizing information to the drive electronics that feeds the four sets (or "phases") of coils. The motor depicted in FIG. 21 acts as a four-phase linear motor. Other numbers of phases are possible, such as three, five, six, etc. Although the profiling of current pulses depicted in FIG. 23 is square, the edges of the pulses may be rounded or tapered, even until the pulses become sinusoidal in shape.

Figure 24:
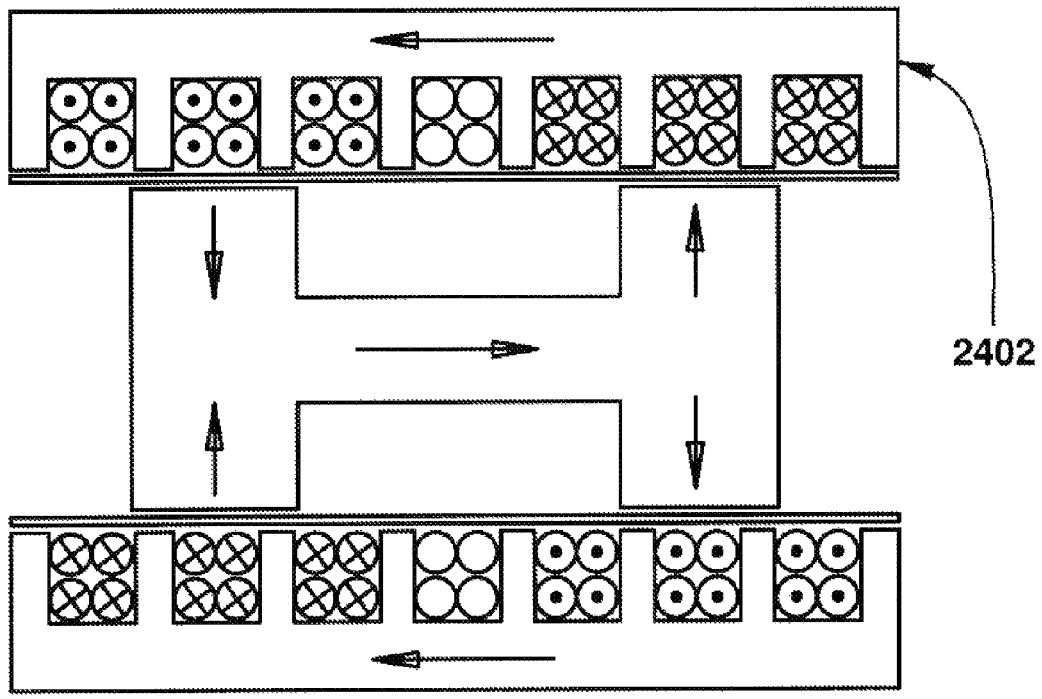
FIG. 24 is a diagram of a winding arrangement in which a magnetically-permeable cylinder has teeth surrounding the winding coils, in accordance with an embodiment of the invention.

FIG. 24 shows a variation of the arrangement of FIG. 21 in which the magnetically-permeable cylinder 2402 has teeth surrounding the winding coils, thereby providing for higher magnetic field strengths with resultant higher power output for a given size of windings and for a given quantity of permanent magnet material, in accordance with an embodiment of the invention. The toothed laminations run axially, and generally take the form shown in the perspective view given in the embodiment of FIG. 25, it being understood that the cross-sectional proportions of the laminations can be varied to suit any particular design.

Laminations.

Figure 25:
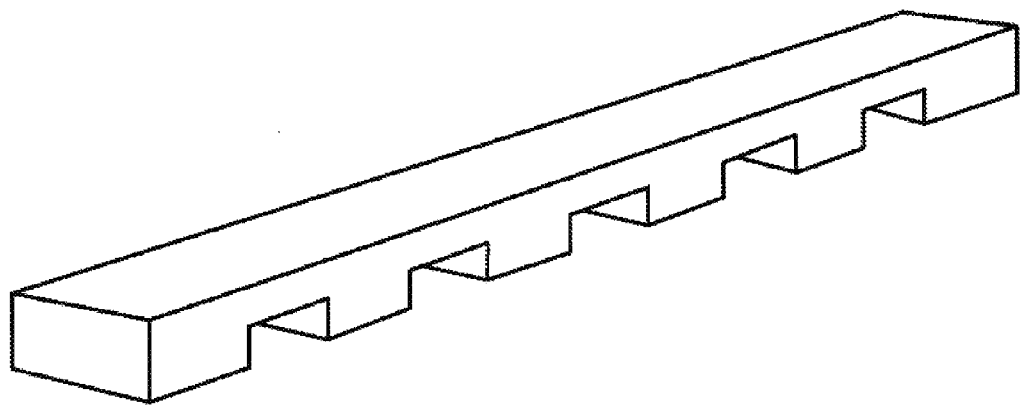
FIG. 25 is a perspective view of toothed laminations, in accordance with an embodiment of the invention.

With a rectangular (straight-sided) cross-section as shown in the embodiment of FIG. 25, there will be tangential gaps between the laminations when they are juxtaposed around the perimeter of the non-magnetic non-conducting thin cylinder 2110. These gaps act as electrical insulation between the laminations, thereby helping to reduce eddy-current losses within the laminations. It is also possible to locate the supporting thin cylinder (2110) on the outside of the laminations rather than on the inside, thereby permitting a smaller magnetic gap between the bobbin flanges and the lamination teeth.

In accordance with an embodiment of the invention, the method for constructing laminations of the tubular synchronous motor of an ACEG machine may be as described above. For both the ICEG and ACEG machines, as well as for the external-combustion machines described in U.S. Pat. No. 7,690,199 B2 of Wood, it may be advantageous to construct the laminations in a somewhat spiral manner, rather than in an axially-straight manner. The result of such a spiral disposition will be to induce a gradual rotation of the shuttle as successive axial strokes are executed. Such rotation will result from the fact that the axial forces going and coming are not symmetrical. The benefit of such rotation will be smooth and even mechanical wear of the bearing surfaces over time, particularly of the piston rings. This will provide for the maintenance of higher efficiency operation as the machine wears with usage and age.

Axially-Magnetized Arrangement.

Figure 26:
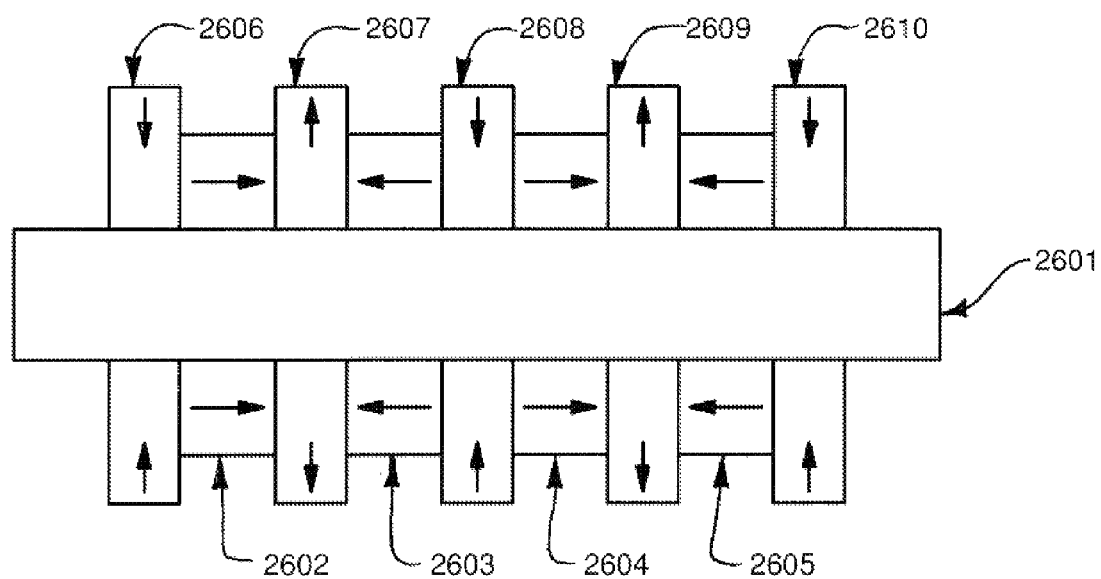
FIG. 26 is a diagram of an arrangement of magnets for use in the magnetic shuttle of an internal combustion electricity generator, in accordance with an embodiment of the invention.

FIG. 26 shows an alternative arrangement of magnets for use in the magnetic shuttle of an ICEG, in accordance with an embodiment of the invention. It is understood that the magnetic shuttle depicted in FIG. 26 performs the function of the shuttle bobbins shown in FIGS. 1, 14, 15, 16, 17, 28 and 31.

Shaft 2601 is made from non-magnetic material. Surrounding shaft 2601 are ring-shaped axially-magnetized permanent magnets 2602, 2603, 2604, and 2605. Interleaved between these magnets are rings of magnetically-permeable material, 2606, 2607, 2608, 2609, and 2610.

In FIG. 26, the arrows marked on the permanent magnets and on the magnetically-permeable rings indicate the direction of the magnetic flux within the bobbin. Permanent magnets 2602, 2603, 2604, and 2605 are placed with alternating axial directions, so that the outside faces of the magnetically-permeable rings have alternating magnetic polarity, (i.e., north-south-north-south, etc.).

Radially-Magnetized Arrangement.

Figure 27:
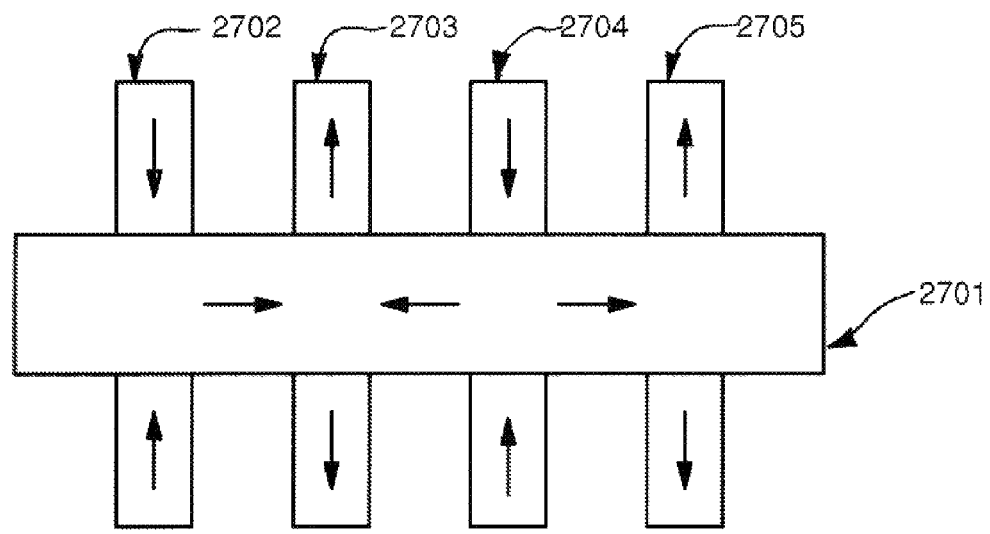
FIG. 27 is a diagram of a further arrangement of magnets for use in the magnetic shuttle of an internal combustion electricity generator, in accordance with an embodiment of the invention.

FIG. 27 shows another alternative arrangement of magnets for use in the magnetic shuttle of an ICEG, in accordance with an embodiment of the invention. Again, it is understood that the magnetic shuttle depicted in FIG. 27 performs the function of the shuttle bobbins shown in FIGS. 1, 14, 15, 16, 17, 28 and 31.

Shaft 2701 is made from magnetically-permeable material, and may have a hollow core. Surrounding shaft 2701 are ring-shaped radially-magnetized permanent magnets 2702, 2703, 2704, and 2705. Interleaved between these magnets are regions of non-magnetic material, which may be air, or may be solid material. Permanent magnets 2702, 2703, 2704, and 2705 may have their volume enhanced by magnetically-permeable rings (not shown in FIG. 27) located either on their outer faces, or on their inner diameters.

In FIG. 27, the arrows marked on the permanent magnets and on the magnetically-permeable shaft 2701 indicate the direction of the magnetic flux within the bobbin. Permanent magnets 2702, 2703, 2704, and 2705 are placed with alternating radial magnetic directions, so that their outside faces have alternating magnetic polarity, (i.e., north-south-north-south, etc.).

It should be noted that in addition to being used with engines described herein, winding and magnet arrangements described herein in connection with FIGS. 21 through 27 may also be used in electric motors generally. Further, such winding and magnet arrangements may also be used with internal and external combustion engines, including those described in connection with FIGS. 3A, 5A and 13 and elsewhere in U.S. Pat. No. 7,690,199 B2 of Wood, entitled "System and Method for Electrically-Coupled Thermal Cycle," the disclosure of which is incorporated herein by reference in its entirety.

Use in Vehicles

Heat engine and thermal cycles described herein in accordance with embodiments of the invention may be useful in all manner of applications, including both stationary and mobile applications. In on embodiment according to the invention, electrically-coupled heat engines and thermal cycles described herein may be used for vehicle engines, with the electricity that is produced by the engine being used to drive electric motors, which may be located at or near some or all of the wheels of the vehicle. The foregoing is desirable to be performed with minimal storage of electricity, in order to minimize the weight of batteries used in the vehicle. Such minimal storage of electricity may be achieved by the use of multiple cylinders, each cylinder functioning as an electrically-coupled heat engine according to an embodiment of the invention. By using such multiple cylinders, the instantaneous power collection from the collection of cylinders may be configured to have a minimal ripple of power output, and therefore require less storage of electricity and therefore less weight of batteries.

Waste Heat Capture

In accordance with an embodiment of the invention, waste heat given off by a heat engine in accordance with embodiments described herein, may be captured and used by an external combustion engine. For example, heat may be captured by a machine that receives its heat from an external heat source, such as the machine described in connection with FIG. 3A of, and elsewhere in, U.S. Pat. No. 7,690,199 B2 of Wood, entitled "System and Method for Electrically-Coupled Thermal Cycle," the disclosure of which is incorporated herein by reference in its entirety; and also such as the air cycle machine described below (the "ACEG").

Implementation of an External Combustion Electricity Generator.

a) Mechanical Arrangement

Figure 28:
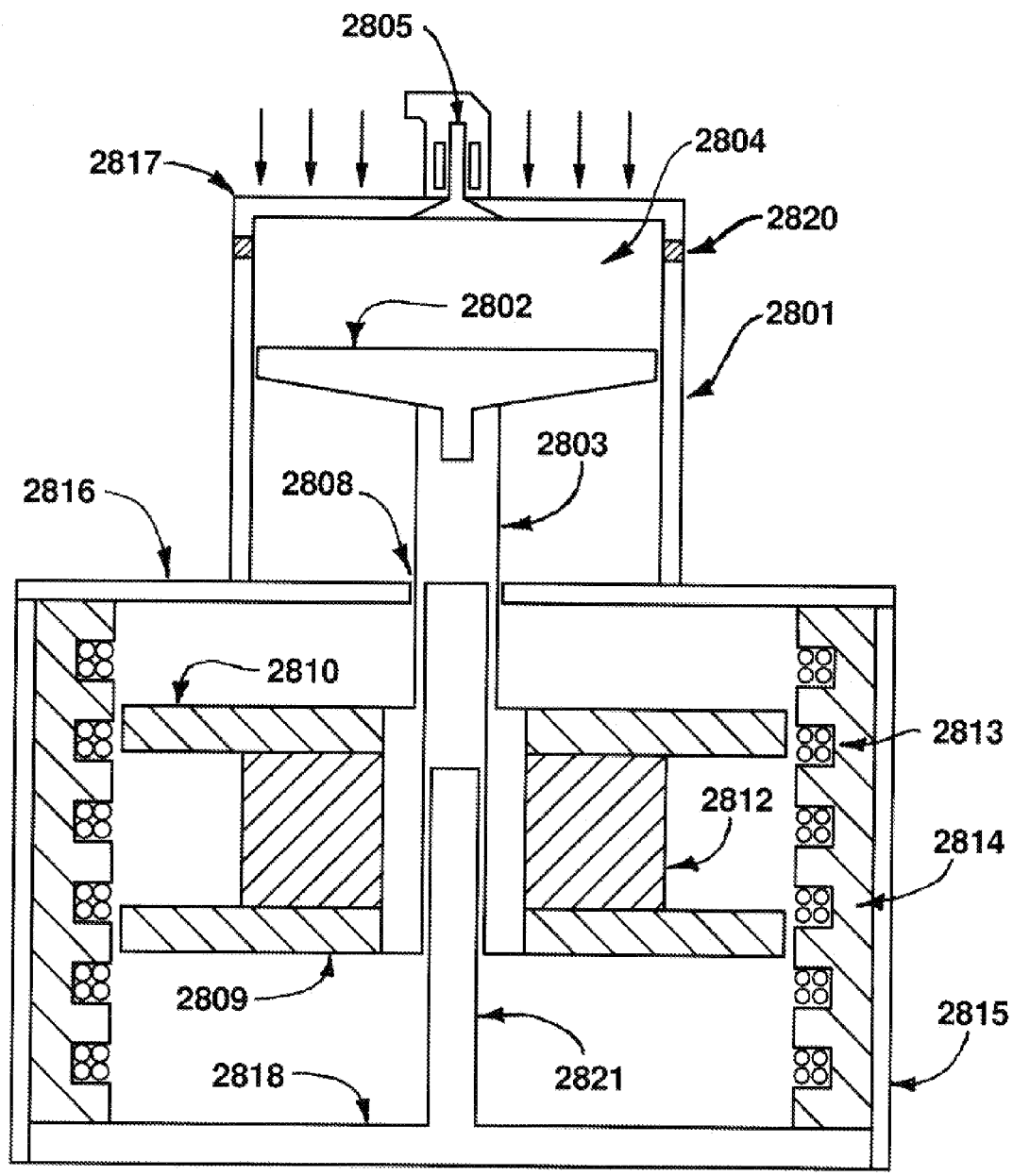
FIG. 28 is a cross-section of a machine to generate electricity from a source of heat, in accordance with an embodiment of the invention.

FIG. 28 is a cross-section of a machine to generate electricity from a source of heat, in accordance with an embodiment of the invention. A working cylinder 2801 houses a piston assembly consisting of a piston head 2802 attached to a central shaft 2803. Between the piston head and one end of the working cylinder 2801 is a working chamber 2804. The end 2817 of the working cylinder 2801 that opposes the piston head 2802 is referred to as the cylinder head. An external source of heat is applied to cylinder head 2817, it being understood that this source of heat is at a temperature higher than the air which is ambient to the cylinder head 2817.

The opposing surfaces of cylinder head 2817 and piston head 2802 need not be flat as shown in FIG. 28. Non-flat shapes for these surfaces will allow for increased surface area for the conduction of heat from the heat source into the working cylinder 2801. By arranging for the two surfaces to have complementary shapes so as to nestle close to each other, minimal volume of the working chamber 2804 is achieved at the time when the piston head approaches the cylinder head. To this end, these two opposing surfaces may be conical or hemispherical in shape. They may also have rings or fins that nestle together with minimal interstitial volume and without mechanical contact.

Separating cylinder head 2817 and working cylinder 2801 is a thermally-insulating ring 2820. At the end of working cylinder 2801 that is away from the cylinder head 2817 is a thermally-insulating disc 2816, through which passes central shaft 2803. Central shaft 2803 is typically made of thermally-insulating material, whereas piston head 2802 may be metallic, and may have a ceramic or other thermally-non-conductive surface coating.

Heat sources for use with an embodiment of the invention include, but are not limited to, firewood and other forms of biomass, fossil fuels, geothermal energy, solar energy, nuclear energy, waste heat from industrial processes, waste heat from gas turbines, waste heat from heat engines including combustion engines, and waste heat from fuel cell system systems. Heat generated from any of these sources is delivered to cylinder head 2817 by standard heat-transfer techniques.

Connecting the working chamber 2804 to the ambient air is a valve 2805. Valve 2805 serves to allow both the inlet and exhaustion of ambient air to and from the working chamber 2804. Typically, but not necessarily, valve 2805 pierces the cylinder head 2817. Alternatively, valve 2805 may also pierce thermally-insulating ring 2820 or it may pierce working cylinder 2801. There may also be a multiplicity of valves 2805 acting in a substantially, but not exactly, synchronous manner. Valve 2805 may be actuated by electric solenoid action, under control from an electronic controller.

Attached to the central shaft 2803, away from the piston head 2802, is a magnetic shuttle assembly in the form of a spool, consisting of two discs 2809 and 2810 surrounding the central shaft 2803. Between shuttle discs 2809 and 2810, and surrounding central shaft 2803, is an array 2812 of permanent magnets. Shuttle discs 2809 and 2810 are made of magnetically-permeable material such as iron or magnet-grade steel or ferrite.

Surrounding shuttle discs 2809 and 2810 are electric windings 2813 embedded in or otherwise attached to magnetically-permeable cylinder 2814, typically made of laminations of magnet-grade steel or of ferrite. Magnetically-permeable cylinder 2814 typically has slots to secure or encompass the windings 2813, as is the manner in electric machines. Arranged together, magnet array 2812, shuttle discs 2809 and 2810, and laminations 2814 form a magnetic circuit, whose flux intersects windings 2813. Accordingly, whenever piston head 2802 moves axially within working cylinder 2801, a voltage is induced in windings 2813 by the shuttle discs 2809 and 2810. Conversely, whenever an electric current is passed through windings 2813, an axial force is exerted on the shuttle discs 2809 and 2810 by the windings 2813. This force is translated by the central shaft 2803 to the piston head 2802. Position sensors (not shown in FIG. 28) provide information to an electronic controller. It is understood that shuttle discs 2809 and 2810 do not contact either the electric windings 2813 or the laminations 2814 at any time during their travel.

Surrounding laminations 2814 is a winding support cylinder 2815, which is attached to working cylinder 2801 by thermally-insulating disc 2816. Attached to the opposing end of winding support cylinder 2815 is a shaft support disc 2818. Attached centrally to shaft support disc 2818 is a shaft support pin 2821 that fits inside central shaft 2803. Shaft support pin 2821 provides lateral support to the shuttle assembly made up of piston head 2802, shaft 2803, magnet array 2812, and shuttle discs 2809 and 2810.

Piston head 2802 typically features piston rings (not shown in FIG. 28) for mechanical contact with the inside wall of working cylinder 2801. Orifice 2808 at the inner diameter of insulating disc 2816 restricts airflow between the working cylinder 2801 and the magnet array 2812, while maintaining a small clearance between the central shaft 2803 and the insulating disc 2816, to avoid mechanical wear.

Shaft support disc 2818 typically is perforated with a plurality of orifices (not shown in FIG. 28) to allow for atmospheric air cooling of the magnet array 2812. Lower shuttle disc 2809 may similarly be perforated with a plurality of orifices (not shown in FIG. 28) to allow for air cooling of the magnet array 2812. Air cooling of the magnets may be assisted by a cooling fan (not shown in FIG. 28). Upper shuttle disc 2810 may have thermal insulation (not shown in FIG. 28) on its upper surface (facing insulating disc 2816) to resist heat flow from the working cylinder 2801 toward the magnet array 2812.

In FIG. 28 winding support cylinder 2815 is depicted as having a larger diameter than working cylinder 2801. In other embodiments, these two cylinders may have the same diameter, or the working cylinder 2801 may have a larger diameter than the winding support cylinder 2815. An encompassing cylinder or jacket (not shown in FIG. 28) may be located around the working cylinder 2801 to restrict heat loss from the exterior surface of the working cylinder. Valve 2805 may be actuated by electric solenoid action, under control from an electronic controller.

b) Electrical Arrangement

The embodiment of FIG. 28 may be operated with the general electrical arrangement shown in FIG. 2, in accordance with an embodiment of the invention. The windings 201 connect to an electronic power converter 202. FIG. 2 shows two isolated windings for illustrative convenience, but any number of separate windings may be employed, as necessary. Also connected to electronic power converter 202 are signals from an electronic controller 208, which receives signals from position sensors 203. Although two sensors are shown in FIG. 2, any number of position sensors may be employed. The position sensors 203 give the electronic controller 208 the information that it needs for it to know the exact location of the shuttle discs 2809 and 2810 at any instant in time.

Electronic power converter 202 is also connected to a DC bus 207, to which is also attached a capacitor (or supercapacitor) 204 and a battery 205 and an electric load 206. The electric load may be disconnected from the bus when not required, while the electronic power converter 202 continues to charge the battery 205. Electronic controller 208 also receives current and voltage signals from the DC bus 207, as well as current and voltage signals from the windings 201.

During operation of the system, the electronic controller 208 controls the flow of electric current into and out of the windings in such a manner as to cause the motion of the shuttle to move up and down (i.e., axially) so as to effect energy transfer from compressed air in the working chamber through the windings, and through the electronic power converter 202 to the electric load 206. The capacitor 204 and battery 205 act as the energy reservoir for the system, and absorb the cyclic energy variations which are integral to the cycles of heat engines. The electronic power converter 202 stores little or no energy, and transfers power between the DC bus 207 and the windings 201 in a highly efficient manner.

c) Thermal Cycle

The operation of a heat engine that employs a quantity of gas as an operating medium may be described by reference to a pressure-volume diagram, hereinafter referred to as a P-V diagram.

Figure 29:
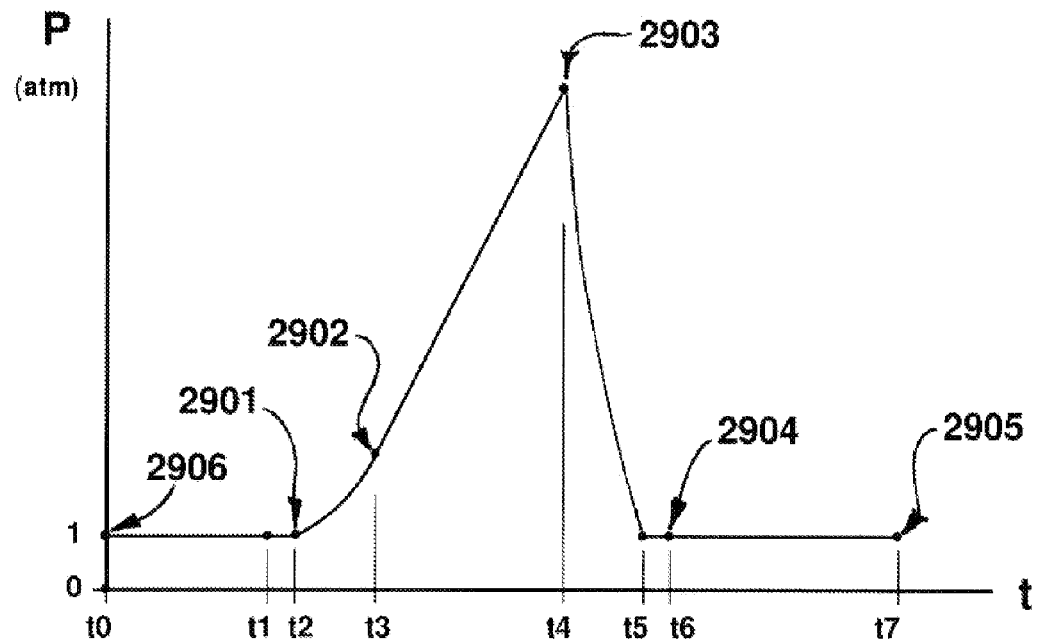
FIG. 29 is a graph of pressure versus time in operation of the machine of the embodiments of FIGS. 1 and 2, in accordance with an embodiment of the invention.
Figure 30:
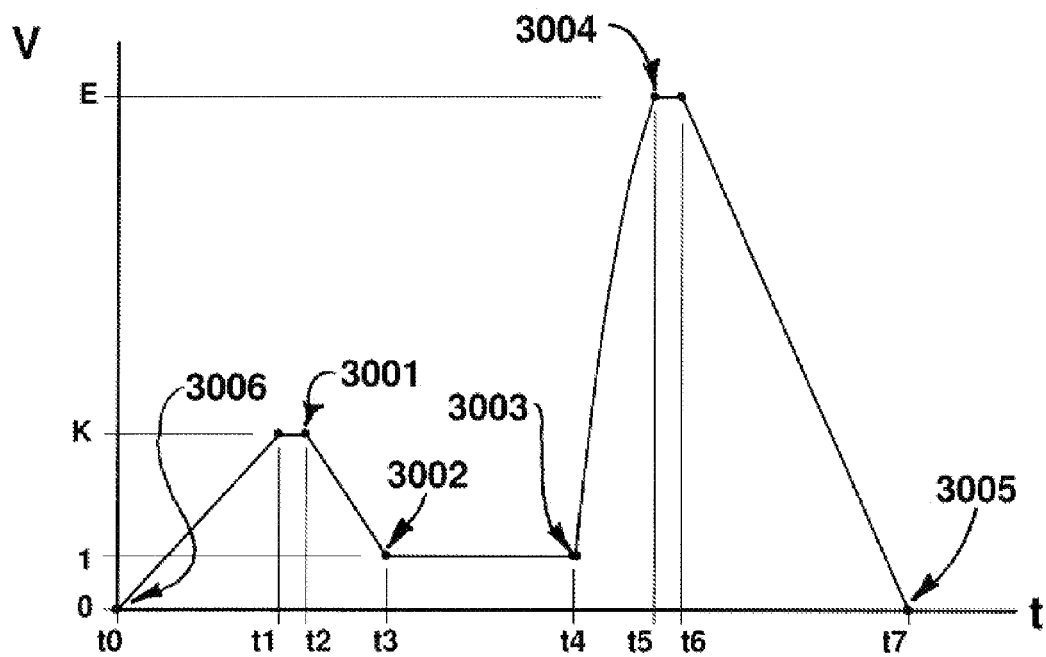
FIG. 30 is a graph of volume versus time in operation of the machine of the embodiments of FIGS. 1 and 2, in accordance with an embodiment of the invention.

FIG. 3 shows a pressure-volume diagram for advantageous operation of the machine of the embodiments of FIGS. 28 and 2, the Air Cycle Electricity Generator, hereinafter referred to as the "ACEG," in accordance with an embodiment of the invention. The pressure P represented in FIG. 3 is the pressure within the working chamber 2804 of FIG. 28, and the volume V represented in FIG. 3 is the volume of gas within that working chamber. The cycle of operation depicted in FIG. 3 will hereinafter be referred to as the Complete ACEG Cycle. (Truncated versions will be described below.) Motion in the time domain is depicted in FIGS. 29 and 30, which display pressure P and volume V versus time, in accordance with an embodiment of the invention. In addition to being defined by a P-V cycle, an ACEG Cycle in an embodiment according to the invention may be defined by a time domain sequence.

Consider a single cycle of operation beginning at point 305 in FIG. 3. The volume of gas is zero, indicating that the piston shaft 2803 has moved to its uppermost limit, leaving minimal space between piston head 2802 and cylinder head 2817. (In this explanation it is assumed that the valve 2805 takes up negligible volume inside the working chamber 2804.) At point 305 in FIG. 3 the pressure is 1 atmosphere, (following an exhaustion stroke at atmospheric pressure.)

Step i), Induction:

With valve 2805 open, ambient air is drawn into the working chamber 2804 at atmospheric pressure during $t_0$ to $t_1$, until point 301 is reached as determined by the electronic controller 208. Let the volume of the working chamber 2804 at point 301 be K.

Step ii), Compression:

Following closure of the valve 2805 during $t_1$ to $t_2$, the air in the working chamber 2804 is now compressed adiabatically (i.e., with no thermal losses) during $t_2$ to $t_3$ until point 302 is reached as determined by the electronic controller 208. Let us arbitrarily define the volume of the working chamber 2804 at point 302 to be 1 unit.

Step iii), Heating:

Beginning at point 302, the electronic controller 208 initiates no further motion, and holds the piston head 2802 stationary while heat flows into the working chamber 2804 through cylinder head 2817. This heat flow continues until the pressure P has risen to point 303 as determined by the electronic controller 208. As indicated in FIGS. 29 and 30, this pressure rise step takes finite time, from $t_3$ to $t_4$. Note that for heat to flow in the required direction, the temperature of the external heat source must be higher than the temperature attained by the compressed air at point 302 of the cycle, i.e., at the end of the compression stroke.

Step iv), Expansion:

At point 303 the electronic controller 208 initiates an adiabatic expansion of the heated air in the working chamber 2804, until the pressure has fallen during $t_4$ to $t_5$ all the way back to unity (atmospheric pressure) at point 304. Let the volume of the working chamber 2804 at point 304 be E.

Step v), Exhaustion:

At point 304, valve 2805 is opened during $t_5$ to $t_6$, following which the electronic controller 208 causes upwards motion of the piston shaft 2803 during $t_6$ to $t_7$ until almost all air in the working chamber 2804 is exhausted. Another cycle may or may not be initiated immediately, as determined by the electronic controller 208. Valve 2805 remains open throughout the exhaustion and induction strokes. In order to minimize the intake of hot air that has just been exhausted, an external electronically-controlled flap or valve (not shown in FIG. 28) may be employed to ensure that fresh cool air is drawn in through valve 2805 during the induction stroke.

It should be noted that times taken for each of the major strokes (induction, compression, expansion, exhaustion) need not be the same, as is the case in a conventional internal combustion engine, and that these times may be varied relative to each other by an electronic controller, in accordance with an embodiment of the invention. Note also that with expansion all the way to atmospheric pressure being possible in an embodiment according to the invention, the audible sound of exhaust may be lower than conventional internal combustion engines, and may allow the reduction in size of, or elimination of, the muffler.

d) Variable Energy Output Per Cycle

The output energy per cycle for an ACEG can be varied by altering the length of the intake stroke (305-301 in FIG. 3), in accordance with an embodiment of the invention. In any given physical embodiment of an ACEG machine, there will be a practical limit to the expansion distance. If the inlet stroke magnitude is increased beyond a certain limit imposed by that expansion distance in accordance with the laws of thermodynamics, then it will be necessary to partially truncate the expansion stroke, as shown in FIG. 9, which depicts a Partially Truncated ACEG Cycle. In the limiting case of a fully truncated expansion stroke as shown in FIG. 10, the inlet stroke and expansion stroke are of equal length, thereby yielding a Fully Truncated ACEG Cycle.

FIG. 11 displays a family of four ACEG cycles of varying energy content, in accordance with an embodiment of the invention. The first two cycles, with pressure peaks at points A and B, are Complete ACEG Cycles. The cycle with pressure peak at point C is a Partially Truncated ACEG Cycle. The cycle with pressure peak at point D is a Fully Truncated ACEG Cycle.

e) Waste Heat Capture

In accordance with an embodiment of the present invention, waste heat given off by another heat engine (such as an internal combustion engine) may be captured and used as the source of heat for an ACEG. For example, heat may be captured from an ICEG as described herein. Waste heat sources for use with the present invention include, but are not limited to, industrial processes, gas turbines, other heat engines including combustion engines, and fuel cell system systems such as those of the solid-oxide type.

f) Electronic Controller Implementation

In accordance with an embodiment of the invention, an electronic controller can be implemented for an ACEG to follow the cycle of FIG. 3 in a manner similar to that described above with reference to FIGS. 12 and 13. A difference between the ACEG controller in accordance with an embodiment of the invention and the ICEG controller is that, for the ACEG machine, at the end of the compression stroke (points 302, 2902, and 3002 in FIGS. 3, 29, and 30) the controller must ensure that the shuttle is held stationary until the pressure reaches the requisite level (at point 2903 of FIG. 29) before the shuttle is released for the expansion stroke. This high-pressure point will typically be detected by a pressure sensor, although a temperature sensor may also suffice. This decision point in the ACEG cycle replaces the corresponding decision point in the ICEG cycle at which ignition is detected.

g) Other Improvements

Improvements described above can be applied to the ACEG machine, in accordance with an embodiment of the invention. These include employing axial opposition of cylinders, the use of heat pipes to assist the cooling of the permanent magnets, methods for constructing valves, methods for constructing the tubular synchronous motor, gravity-assisted energy capture, magnetically-assisted energy capture, magnetic bumpers for lossless resting, and cycles that are either periodic or aperiodic.

h) Single valve ICEG

In another embodiment according to the invention, the method of using a single valve for the intake and exhaustion of air into and out of the working cylinder as described above for an air-cycle electric generator (ACEG) may also be employed in an internal combustion electric generator (ICEG) of the general type as described above. The principle of such a scheme is illustrated in the ICEG of the embodiment of FIG. 31, the arrangement of which is similar to that of the ACEG of FIG. 28 herein, with the difference that a fuel injector 3122 is included and the thermally-insulating ring 2820 is omitted. In addition, an air plenum 3123 surrounds air valve 3105.

Incoming air flows into one orifice of plenum 3123, and exhaust air flows out of a second orifice of plenum 3123. Inside plenum 3123 an electronically-controlled flap 3124 serves to divert the flow of air within the plenum. Motion of flap 3124 is synchronized with the thermal cycle in such a way that exhaust air flows out of working chamber 3104 through the exhaust duct, and inlet air flows through the inlet duct into the working chamber 3104 when required.

Figure 31:
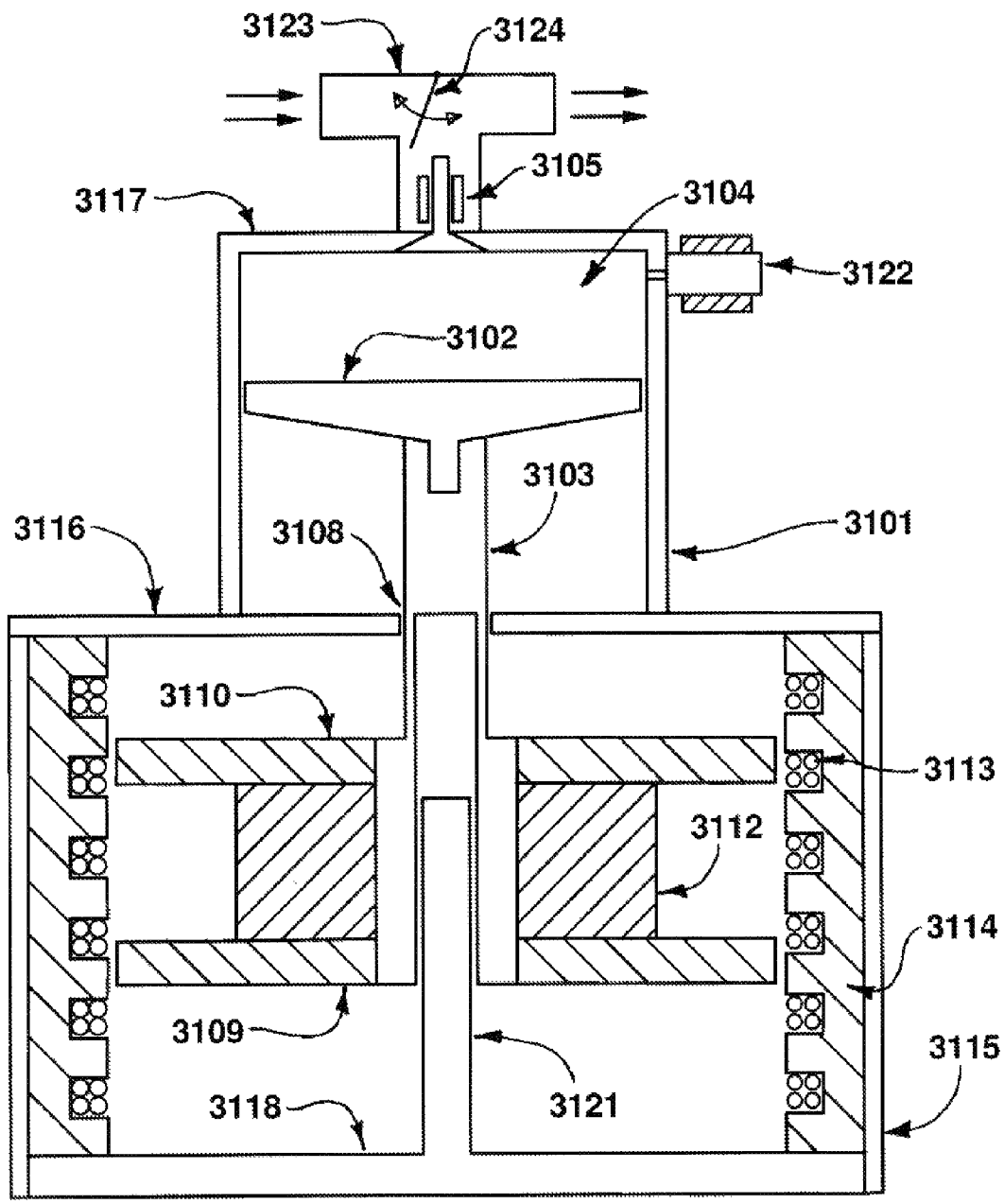
FIG. 31 is a diagram illustrating a method of using a single valve for the intake and exhaustion of air into and out of the working cylinder in an internal combustion electric generator (ICEG), in accordance with an embodiment of the invention.

Flap 3124 is shown in FIG. 31 by way of illustrating the principle of operation of this embodiment of the invention. In practice, other methods of diverting air flow in the plenum may be employed, including the use of an electronically-controlled rotary valve in place of flap 3124. By comparison with the requirements of valve 3105, air-tightness is not required for the diverting means that performs the function of flap 3124. Accordingly, advantages of an embodiment according to the present invention include reduced cost and improved reliability by comparison with an engine having two or more valves piercing the combustion chamber.

i) Heat Pump

While the embodiments of FIGS. 1, 2, 12, 13, 14, 15, 16, 17, 19, 28, and 31 have been described as generators, by which heat is converted to electricity, it is also possible to use an electrically-coupled thermal cycle in accordance with embodiments of the invention to create an electrically-powered heat pump. In this case, the embodiments of FIGS. 1, 2, 12, 13, 14, 15, 16, 17, 19, 28, and 31 are essentially operated in reverse: energy stored in electrical circuitry such as that of FIG. 2 is cycled in and out of a working cylinder such as 2801 via windings 2813 so that piston head 2802 performs a heat pump cycle, and likewise for the other arrangements. Such a heat pump may be used to extract heat energy from ambient air, and to deliver that heat to an external heat sink by way of cylinder head 2817. It may also be used to produce liquid and/or gaseous fuels from constituent elements, for instance to produce ammonia from a mixture of hydrogen and nitrogen.

Figure 32:
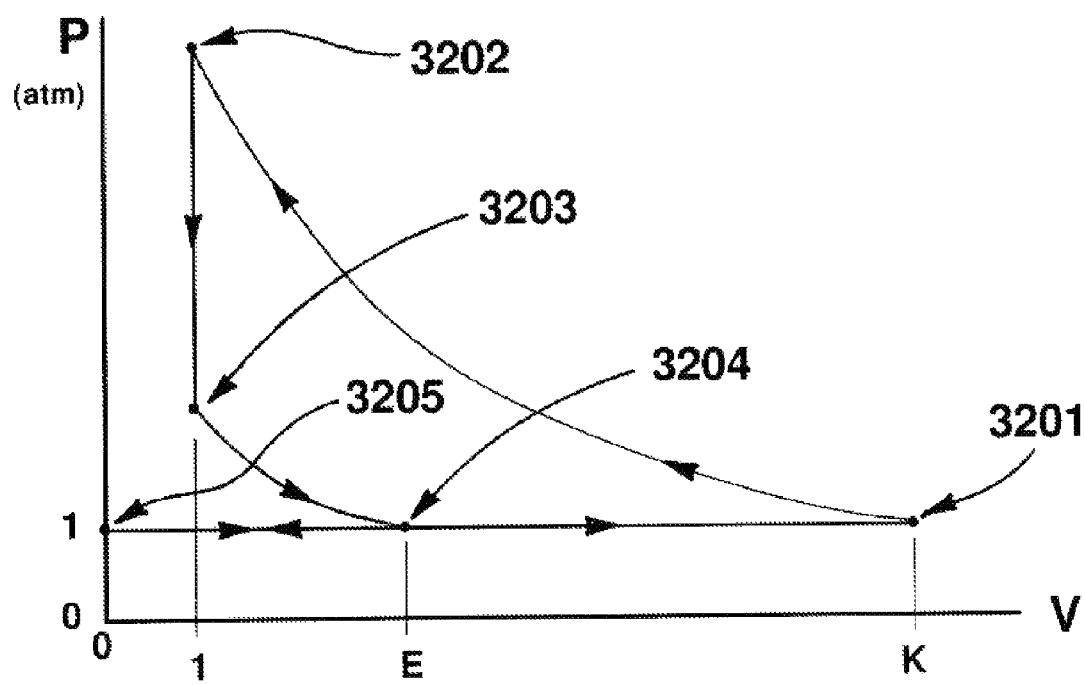
FIG. 32 shows a pressure-volume diagram for advantageous operation of the machine of the embodiments of FIGS. 28, 31 and 2 when operated as a heat pump, in accordance with an embodiment of the invention.
Figure 33:
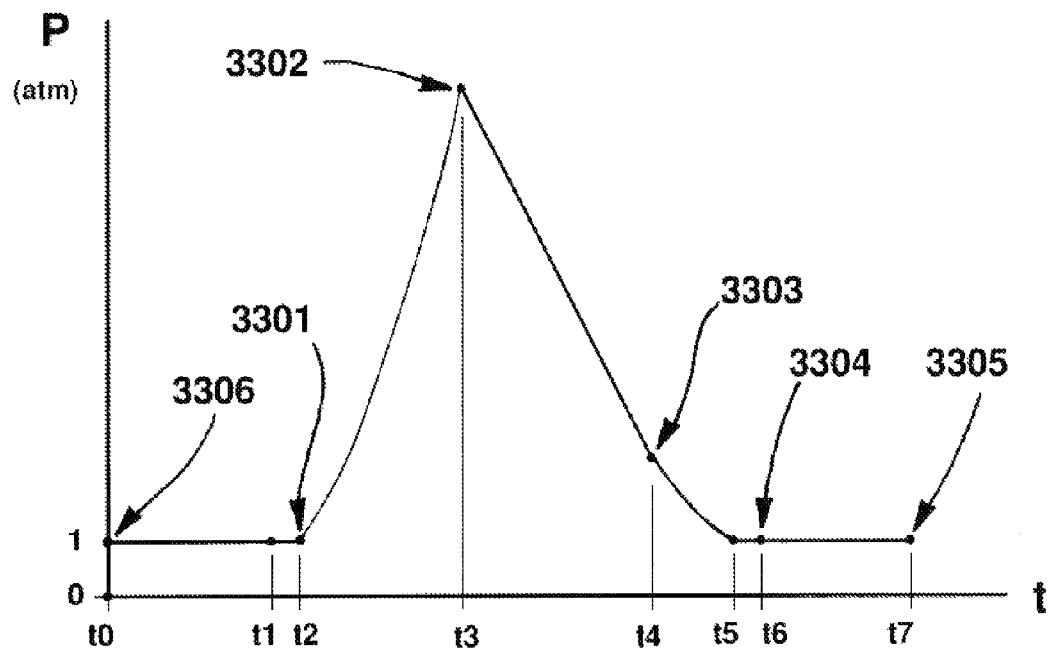
FIG. 33 is a graph of pressure versus time in operation of the machine of the embodiment of FIG. 31, in accordance with an embodiment of the invention.
Figure 34:
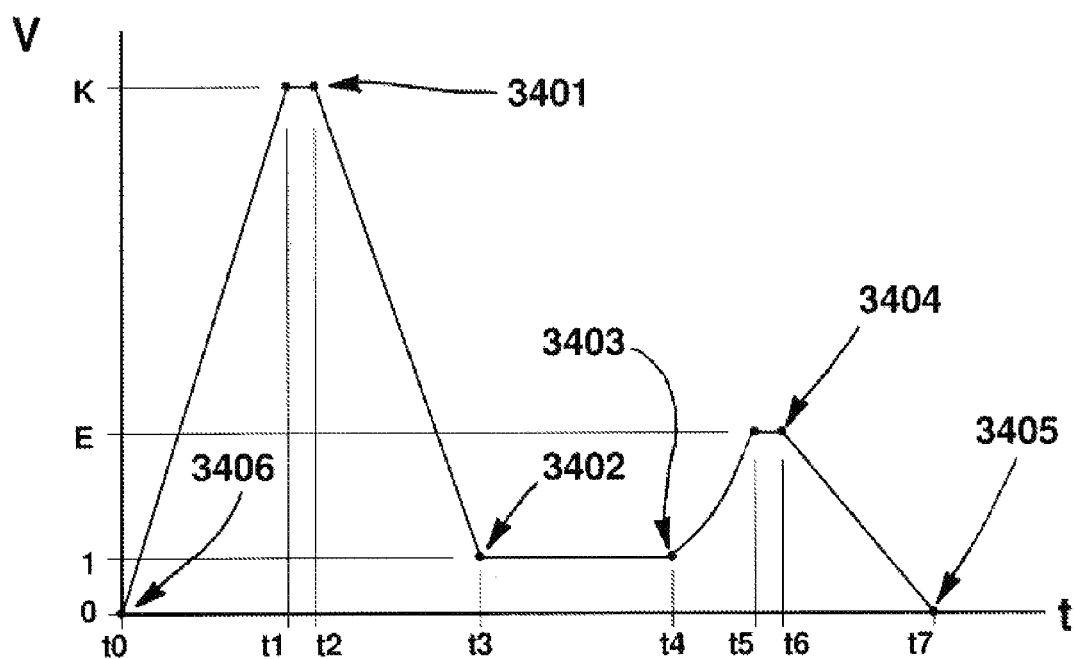
FIG. 34 is a graph of volume versus time in operation of the machine of the embodiment of FIG. 31, in accordance with an embodiment of the invention.

FIG. 32 shows a P-V diagram for such a heat pump (i.e., a refrigerator, or air conditioner) operated in accordance with an embodiment of the invention. FIGS. 33 and 34 give the associated timing diagrams for pressure and volume versus time, in accordance with an embodiment of the invention.

Consider a single cycle of operation beginning at point 3205 in FIG. 32. The volume of gas is zero, indicating that the piston shaft 2803 has moved to its uppermost limit, leaving minimal space between piston head 2802 and cylinder head 2817. (In this explanation it is assumed that the valve 2805 takes up negligible volume inside the working chamber 2804.) At point 3205 in FIG. 32 the pressure is 1 atmosphere, (following an exhaustion stroke at atmospheric pressure.)

Step i), Induction:

With valve 2805 open, ambient air is drawn into the working chamber 2804 at atmospheric pressure during $t_0$ to $t_1$, until point 3201 is reached as determined by the electronic controller 208. Let the volume of the working chamber 2804 at point 3201 be K.

Step ii), Compression:

Following closure of the valve 2805 during $t_1$ to $t_2$, the air in the working chamber 2804 is now compressed adiabatically (i.e., with no thermal losses) during $t_2$ to $t_3$ until point 3202 is reached as determined by the electronic controller 208. Let us arbitrarily define the volume of the working chamber 2804 at point 3202 to be 1 unit.

Step iii), Cooling:

Beginning at point 3202, the electronic controller 208 initiates no further motion, and holds the piston head 2802 stationary while heat flows out of the working chamber 2804 through cylinder head 2817. This heat flow continues until the pressure P has fallen to point 3203 as determined by the electronic controller 208. As indicated in FIGS. 33 and 34, this fall in pressure takes finite time, from $t_3$ to $t_4$. Note that for heat to flow in the required direction, the temperature of the external heat sink must be lower than the temperature attained by the compressed air at point 3202 of the cycle, i.e., at the end of the compression stroke.

Step iv), Expansion:

At point 3203 the electronic controller 208 initiates an adiabatic expansion of the air in the working chamber 2804, until the pressure has fallen during $t_4$ to $t_5$ all the way back to unity (atmospheric pressure) at point 3204. Let the volume of the working chamber 2804 at point 3204 be E.

Step v), Exhaustion:

At point 3204, valve 2805 is opened during $t_5$ to $t_6$, following which the electronic controller 208 causes upwards motion of the piston shaft 2803 during $t_6$ to $t_7$ until almost all air in the working chamber 2804 is exhausted. Another cycle may or may not be initiated immediately, as determined by the electronic controller 208. Valve 2805 remains open throughout the exhaustion and induction strokes. In order to minimize the intake of cool air that has just been exhausted, an external electronically-controlled flap or valve (not shown in FIG. 28) may be employed to ensure that fresh air is drawn in through valve 2805 during the induction stroke.

It should be noted that times taken for each of the major strokes (induction, compression, expansion, exhaustion) need not be the same, as is the case in a conventional mechanically-reciprocating machine, and that these times may be varied relative to each other by an electronic controller, in accordance with an embodiment of the invention. Note also that with expansion all the way to atmospheric pressure being possible in an embodiment according to the invention, the audible sound of exhaust may allow the reduction in size, or elimination of, a muffler.

To illustrate the use of a heat pump of the type shown in FIG. 28 for the production of a fuel, in accordance with an embodiment of the invention, we note that, with a suitable catalyst present, the application of heat and pressure to a mixture of hydrogen and nitrogen will yield ammonia in accordance with the following chemical equation:

$$3H_2 + N_2 = 2NH_3 \quad \text{(Equation 23)}$$

We refer again to FIGS. 28, 32, 33, and 34. One cycle of ammonia production is completed as follows:

Step i), Induction:

With valve 2805 open, a pre-heated mixture of hydrogen and nitrogen is drawn into the working chamber 2804 at a suitable pressure during $t_0$ to $t_1$, until point 3201 is reached as determined by the electronic controller 208. Let the volume of the working chamber 2804 at point 3201 be K.

Step ii), Compression:

Following closure of the valve 2805 during $t_1$ to $t_2$, the pre-heated mixture of hydrogen and nitrogen in the working chamber 2804 is now compressed adiabatically (i.e., with no thermal losses) during $t_2$ to $t_3$ until point 3202 is reached as determined by the electronic controller 208. Let us arbitrarily define the volume of the working chamber 2804 at point 3202 to be 1 unit. During this compression step of the cycle, and with a suitable catalyst present on the inside surfaces of the combustion chamber 2804, ammonia is formed, in accordance with Equation 23.

Step iii), Cooling:

Beginning at point 3202, the electronic controller 208 initiates no further motion, and holds the piston head 2802 stationary while heat flows out of the working chamber 2804 through cylinder head 2817. This heat outflow may be used to pre-heat an incoming charge of hydrogen and nitrogen, thereby effecting an overall energy savings. Heat flow continues until the pressure P has fallen to point 3203 as determined by the electronic controller 208. As indicated in FIGS. 33 and 34, this fall in pressure takes finite time, from $t_3$ to $t_4$. Note that for heat to flow in the required direction, the temperature of the external heat sink must be lower than the temperature attained by the compressed mixture in the working chamber at point 3202 of the cycle, i.e., at the end of the compression stroke.

Step iv), Expansion:

At point 3203 the electronic controller 208 initiates an adiabatic expansion of the cooled ammonia in the working chamber 2804, until the pressure has fallen during $t_4$ to $t_5$ all the way back to point 3204. Let the volume of the working chamber 2804 at point 3204 be E.

Step v), Exhaustion:

At point 3204, valve 2805 is opened during $t_5$ to $t_6$, following which the electronic controller 208 causes upwards motion of the piston shaft 2803 during $t_6$ to $t_7$ until almost all gas in the working chamber 2804 is exhausted.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A device for producing a combustible fuel from two or more reactants using electrical energy, the producing of the combustible fuel comprising performing a thermal cycle of a working mixture of the two or more reactants, the device comprising:
   a container;
   at least one piston movably mounted in the container to form a working chamber between the at least one piston and the container, the working chamber containing a catalyst for the producing of the combustible fuel, and containing the working mixture during the thermal cycle;
   an electrical circuit mounted stationary relative to the container, the electrical circuit being electromagnetically coupled to provide a motive force to the at least one piston;
   an electronic power converter electrically connected to the electrical circuit and to an electrical bus;
   an electrical storage device electrically connected to the electrical bus;
   the at least one piston being movably mounted such that its motion electromagnetically induces current in the electrical circuit.

2. The device of claim 1, wherein the catalyst is present on at least one inside surface of the working chamber.

3. The device of claim 1, wherein the combustible fuel produced comprises a liquid fuel.

4. The device of claim 1, wherein the combustible fuel produced comprises ammonia.

5. The device of claim 1, further comprising an electronic controller electronically connected to the electronic power converter to control motion of the at least one piston to perform, in the thermal cycle, at least one of: (i) compressing the working mixture over a volume greater than a volume through which the working mixture is expanded within the thermal cycle or (ii) exhausting the working mixture to a remaining volume less than a smallest volume of compressed gas mixture within the thermal cycle.

6. The device according to claim 1, wherein an exterior surface of the container is configured to conduct heat energy from the working mixture.

7. The device according to claim 1, wherein the at least one piston comprises two pistons sharing a common working chamber.

8. The device according to claim 1, further comprising an electronic controller comprising a binary counter with a state corresponding to each stroke of the thermal cycle, the strokes of the thermal cycle comprising induction, compression, expansion, and exhaustion.

9. The device according to claim 1, further comprising an electronic controller configured to control the at least one piston to perform a thermal cycle comprising strokes of induction, compression, expansion and exhaustion, and wherein a duration of any one of the thermal cycle strokes of induction, compression, expansion, and exhaustion differs from the duration of any of the other said strokes.

10. The device according to claim 1, further comprising an electronic controller configured to control the at least one piston to perform a thermal cycle comprising strokes of induction, compression, expansion and exhaustion, and wherein a distance traversed by the at least one piston relative to the container in any one of the strokes of induction, compression, expansion, and exhaustion differs from a distance traversed by the at least one piston relative to the container during any of the other strokes.

11. A method for producing a combustible fuel from two or more reactants using electrical energy, the producing of the combustible fuel comprising performing a thermal cycle of a working mixture of the two or more reactants, the method comprising:

using the motion of at least one piston in a container, containing the working mixture during the thermal cycle, to electromagnetically induce current in an electrical circuit mounted stationary relative to the container, the electrical circuit being electrically connected to an electronic power converter;

transferring electrical energy, produced by the current induced in the electrical circuit, to an electrical bus electrically connected to the electronic power converter and electrically connected to an electrical storage device;

transferring electrical energy from the electrical bus to the electrical circuit to electromagnetically provide a motive force to the at least one piston; and producing the combustible fuel, during the thermal cycle, from the working mixture of the two or more reactants.

12. The method of claim 11, wherein a catalyst is present on at least one inside surface of the working chamber.

13. The method of claim 11, wherein the combustible fuel produced comprises a liquid fuel.

14. The method of claim 11, wherein the combustible fuel produced comprises ammonia.

15. The method of claim 11, further comprising using motion of the at least one piston to perform, in the thermal cycle, at least one of: (i) compressing the working mixture over a volume greater than a volume through which the working mixture is expanded within the thermal cycle or (ii) exhausting the working mixture to a remaining volume less than a smallest volume of compressed gas mixture within the thermal cycle.

16. The method of claim 11, comprising conducting heat energy from the working mixture through an exterior surface of the container.

17. The method of claim 11, comprising using two pistons sharing a common working chamber to perform the thermal cycle.

18. The method of claim 11, comprising controlling the thermal cycle with a binary counter with a state corresponding to each stroke of the thermal cycle, the strokes of the thermal cycle comprising induction, compression, expansion, and exhaustion.

19. The method of claim 11, comprising performing a thermal cycle comprising strokes of induction, compression, expansion and exhaustion, and wherein a duration of any one of the thermal cycle strokes of induction, compression, expansion, and exhaustion differs from the duration of any of the other said strokes.

20. The method of claim 11, comprising performing a thermal cycle comprising strokes of induction, compression, expansion and exhaustion, and wherein a distance traversed by the at least one piston relative to the container in any one of the strokes of induction, compression, expansion, and exhaustion differs from a distance traversed by the at least one piston relative to the container during any of the other strokes.

* * * * *